United States Patent
Shimada

(10) Patent No.: US 7,990,959 B2
(45) Date of Patent: Aug. 2, 2011

(54) PACKET TRANSFER APPARATUS AND PACKET TRANSFER METHOD

(75) Inventor: Katsumi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 12/149,103

(22) Filed: Apr. 25, 2008

(65) Prior Publication Data

US 2009/0010254 A1   Jan. 8, 2009

(30) Foreign Application Priority Data

Jul. 2, 2007   (JP) ................. 2007-174316

(51) Int. Cl.
*H04L 12/28* (2006.01)
*H04L 12/56* (2006.01)
*G06F 15/177* (2006.01)
*G06F 15/16* (2006.01)

(52) U.S. Cl. ......... 370/389; 370/400; 709/220; 709/245

(58) Field of Classification Search ........................ None
See application file for complete search history.

(56) References Cited

U.S. PATENT DOCUMENTS

| | | | | |
|---|---|---|---|---|
| 5,651,004 A | * | 7/1997 | Gass | 370/396 |
| 7,385,918 B2 | * | 6/2008 | Takagi | 370/222 |
| 7,782,784 B2 | * | 8/2010 | Agrawal et al. | 370/236.2 |
| 2004/0125818 A1 | * | 7/2004 | Richardson et al. | 370/432 |
| 2005/0286537 A1 | * | 12/2005 | Shimada | 370/395.53 |
| 2007/0223493 A1 | * | 9/2007 | Sridhar et al. | 370/395.53 |

FOREIGN PATENT DOCUMENTS

JP   2006-203735   8/2006

* cited by examiner

*Primary Examiner* — Xavier Szewai Wong
(74) *Attorney, Agent, or Firm* — Fujitsu Patent Center

(57) ABSTRACT

A network system includes a maintenance terminal and a switch that transfers a packet. Upon receiving a link-trace message packet, the switch transfers, when links to the destination constitute a link aggregation, the link-trace message packet to all physical links constituting the link aggregation. In response to the link-trace message packet, the switch receives a link-trace reply packet from each of the physical links, and generates link-trace result data. the link-trace result data is output to the maintenance terminal.

12 Claims, 45 Drawing Sheets

FIG.3

| TTL | MAC ADDRESS | NUMBER OF CONNECTION LINKS |
|---|---|---|
| 20 | 00-00-00-00-00-0A (ORIGIN) | |
| 19 | 00-00-00-00-00-0B | 2 |
| 18 | 00-00-00-00-00-0C | 3 |
| 17 | 00-00-00-00-00-0E (TARGET) | 1 |

FIG.4

| TRUNK NUMBER | NUMBER OF PORTS IN TRUNK | FIRST PORT NUMBER | SECOND PORT NUMBER | THIRD PORT NUMBER | ... | n-TH PORT NUMBER | LTM-TRANSFER FLAG |
|---|---|---|---|---|---|---|---|
| 1 | 0 | 0 | 0 | 0 | ... | 0 | 0 |
| 2 | 0 | 0 | 0 | 0 | ... | 0 | 0 |
| ... | ... | ... | ... | ... | ... | ... | ... |
| 40 | 2 | 4 | 6 | 0 | ... | 0 | 1 |
| ... | ... | ... | ... | ... | ... | ... | ... |

FIG.11

| TTL | SENDER MAC ADDRESS | TRUNK NUMBER | PORT NUMBER |
|---|---|---|---|
| 19 | 00-00-00-00-0B | 40 | 4 |
| 19 | 00-00-00-00-0B | 40 | 6 |
| 18 | 00-00-00-00-0C | 50 | 7 |
| ⋮ | ⋮ | ⋮ | ⋮ |

FIG.12

| TTL | MAC ADDRESS | NUMBER OF CONNECTION LINKS | TRUNK NUMBER | PORT NUMBER |
|---|---|---|---|---|
| 20 | 00-00-00-00-00-0A (ORIGIN) | | | |
| 19 | 00-00-00-00-00-0B | 2 | 40 | 4, 6 |
| 18 | 00-00-00-00-00-0C | 3 | 50 | 7, 9, 11 |
| 17 | 00-00-00-00-00-0E (TARGET) | 1 | | 5 |

FIG.15

| TTL | MAC ADDRESS | TRUNK NUMBER | NUMBER OF CONSTITUTING LINKS | NORMAL PORT NUMBER | NONRESPONSIVE PORT NUMBER |
|---|---|---|---|---|---|
| 20 | 00-00-00-00-00-0A (ORIGIN) | --- | --- | --- | --- |
| 19 | 00-00-00-00-00-0B | 40 | 2 | 4, 6 | |
| 18 | 00-00-00-00-00-0C | 50 | 3 | 7, 9, 11 | |
| 17 | 00-00-00-00-00-0E (TARGET) | | | 5 | |

FIG.16

| SWITCH MAC ADDRESS | TRUNK NUMBER | NUMBER OF PORTS CONSTITUTING TRUNK | FIRST PORT NUMBER | SECOND PORT NUMBER | THIRD PORT NUMBER | ... | n-TH PORT NUMBER |
|---|---|---|---|---|---|---|---|
| 0A | 40 | 2 | 7 | 8 | 0 | ... | 0 |
| 0B | 40 | 2 | 4 | 6 | 0 | ... | 0 |
| 0B | 50 | 3 | 10 | 11 | 12 | ... | 0 |
| 0C | 50 | 3 | 9 | 11 | 12 | ... | 0 |
| 0C | 60 | 2 | 2 | 4 | 0 | ... | 0 |
| ... | ... | ... | ... | ... | ... | ... | ... |

FIG.19

| PORT MAC ADDRESS | TRUNK NUMBER | PORT NUMBER | SWITCH MAC ADDRESS |
|---|---|---|---|
| 00-00-00-01-0B | 40 | 4 | 00-00-00-00-0B |
| 00-00-00-02-0B | 40 | 6 | 00-00-00-00-0B |
| ⋮ | ⋮ | ⋮ | ⋮ |
| 00-00-00-03-0C | 50 | 7 | 00-00-00-00-0C |
| ⋮ | ⋮ | ⋮ | ⋮ |

FIG.20

| TTL | PORT MAC ADDRESS | SWITCH MAC ADDRESS | TRUNK NUMBER |
|---|---|---|---|
| 19 | 00-00-00-07-0B | 00-00-00-00-0B | 40 |
| 19 | 00-00-00-08-0B | 00-00-00-00-0B | 40 |
| 18 | 00-00-00-07-0C | 00-00-00-00-0C | 50 |
| 18 | 00-00-00-09-0C | 00-00-00-00-0C | 50 |
| ⋮ | ⋮ | ⋮ | ⋮ |

FIG.34

| PORT NUMBER | LINK-AGGREGATION TARGET FLAG | TRUNK NUMBER | FLOODING TARGET FLAG |
|---|---|---|---|
| 1 | 0 | 0 | 1 |
| 2 | 0 | 0 | 1 |
| 3 | 0 | 0 | 1 |
| 4 | 0 | 0 | 1 |
| 5 | 0 | 0 | 1 |
| 6 | 0 | 0 | 1 |
| 7 | 1 | 40 | 1 |
| 8 | 1 | 40 | 0 |

FIG.35

| TRUNK NUMBER | NUMBER OF PORTS IN TRUNK | FIRST PORT NUMBER | SECOND PORT NUMBER | THIRD PORT NUMBER | ... | n-TH PORT NUMBER |
|---|---|---|---|---|---|---|
| 1 | 0 | 0 | 0 | 0 | ⋮ | 0 |
| 2 | 0 | 0 | 0 | 0 | ⋮ | 0 |
| ... | ... | ... | ... | ... | ⋮ | ... |
| 40 | 2 | 7 | 8 | 0 | ⋮ | 0 |
| ... | ... | ... | ... | ... | ⋮ | ... |

FIG.49

| TTL | MAC ADDRESS |
|---|---|
| 20 | 00-00-00-00-00-0A (ORIGIN) |
| 19 | 00-00-00-00-00-0B |
| 18 | 00-00-00-00-00-0C |
| 17 | 00-00-00-00-00-0E (TARGET) |

PACKET TRANSFER APPARATUS AND PACKET TRANSFER METHOD

BACKGROUND OF THE INVENTION

1. Field of the Invention

The present invention relates to a packet transfer apparatus and a packet transfer method.

2. Description of the Related Art

When data is transmitted to a receiver terminal via a network, the data is divided into packets, relayed by a communication apparatus, and delivered to the receiver terminal. Such communication apparatus that relays packets include a layer 2 switch.

Japanese Patent Application Laid-open No. 2006-203735 discloses a conventional technology using link aggregation to improve the quality of a communication link between network elements. Link aggregation is the ability to group a plurality of physical links, such as cables, between network elements into a single virtual physical link.

By the link aggregation, a high-speed communication link can be realized without an expensive cable or communication interface. Besides, a plurality of physical links are used together as a single link, even if part of the physical links fail, the communication link can be prevented from being cut completely, which improves the usability of the communication link.

When packets are transferred by using a link aggregation, one packet is transferred by only one of physical links. In the network including a plurality of communication apparatuses such as layer 2 switches, link trace can be performed to check the connectivity, i.e., connection path, between these communication apparatuses.

The layer 2 switch can constitute a network having a redundant path by a spanning-tree protocol. The link-trace function also enables easy collection of new path information when a path is switched from one to another in the network having such a configuration.

In the conventional technology, however, when communication apparatuses are connected with each other by a link aggregation, a link-trace packet is transferred through only one physical link. Accordingly, it cannot be determined whether packets are transferred without error in all physical links constituting the link aggregation.

Therefore, there is a need of a technology for determining whether packets are transferred without error in all physical links constituting a link aggregation (each physical link in a trunk) using a link-trace packet.

SUMMARY OF THE INVENTION

It is an object of the present invention to at least partially solve the problems in the conventional technology.

According to an aspect of an embodiment, there is provided a packet transfer apparatus that transfers a packet by using a trunk that is a virtual logical link consisting of multiple physical links. The packet transfer apparatus includes a determining unit that determines, upon receipt of a packet, whether the packet is a search packet for path search; and an output controller that outputs, when the packet is a search packet, the search packet to the physical links constituting the trunk.

According to another aspect of an embodiment, there is provided a packet transfer method of transferring a packet by using a trunk that is a virtual logical link consisting of multiple physical links. The packet transfer method includes determining, upon receipt of a packet, whether the packet is a search packet for path search; and outputting, when the packet is a search packet, the search packet to the physical links constituting the trunk.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is one example of link-trace result data according to the first embodiment;

FIG. 4 is one example of data structure of a link-aggregation management table;

FIG. 11 is one example of data structure of a reception LTR table according to the second embodiment;

FIG. 12 is one example of link-trace result data according to the second embodiment;

FIG. 15 is another example of link-trace result data;

FIG. 16 is one example of data structure of a trunk configuration database;

FIG. 19 is one example of data structure of a port MAC-address management table;

FIG. 20 is one example of link-trace result data according to the third embodiment;

FIG. 34 is one example of data structure of a conventional port management table;

FIG. 35 is one example of data structure of a conventional link-aggregation management table;

FIG. 49 is one example of conventional link-trace result data.

DETAILED DESCRIPTION OF THE PREFERRED EMBODIMENTS

Exemplary embodiments of the present invention are explained in detail below with reference to the accompanying drawings.

Figure 32:
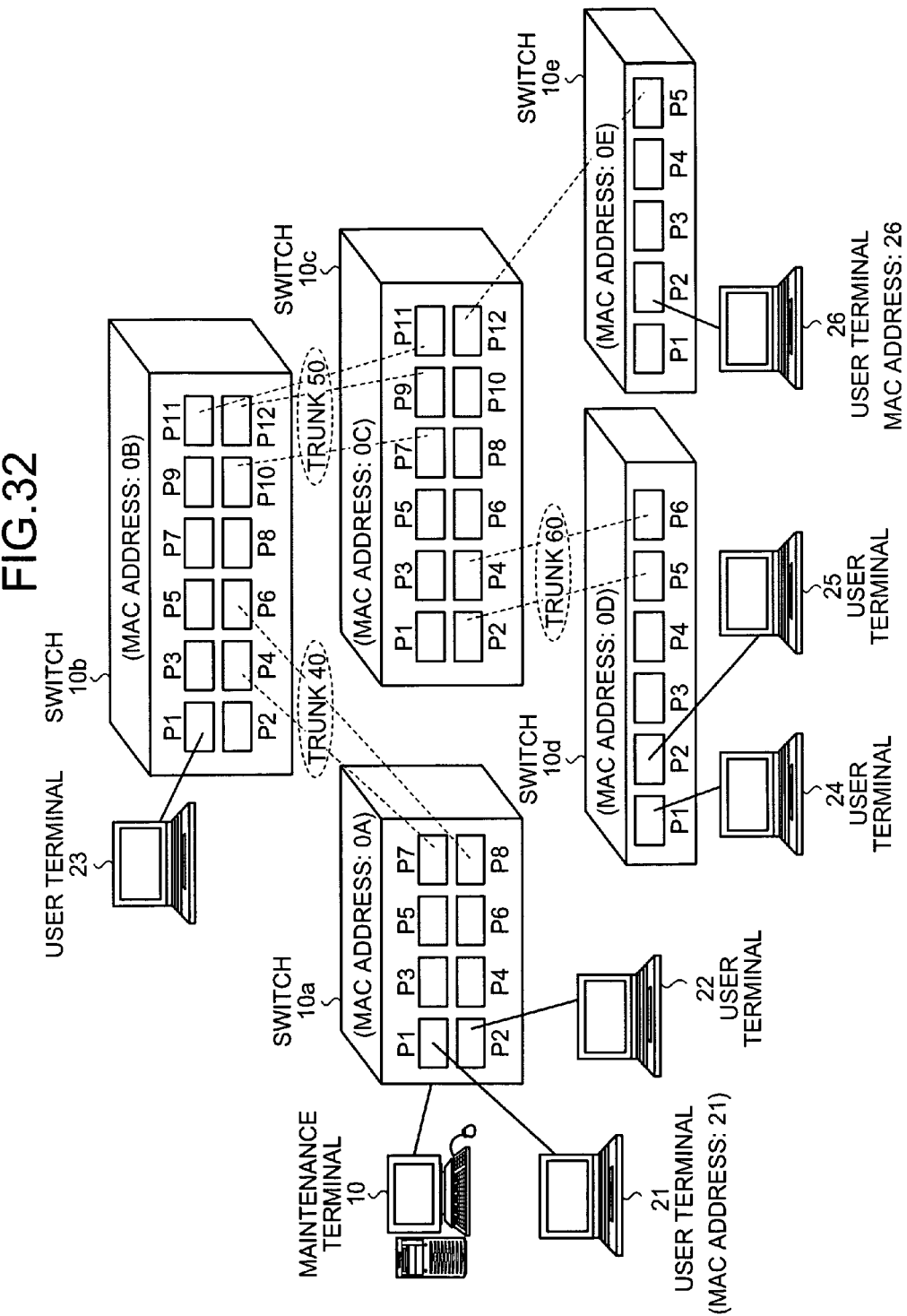
FIG. 32 is a schematic diagram of a conventional network system.

Before explaining a first embodiment of the present invention, a conventional technology is explained to point out problems therein. FIG. 32 is a schematic diagram of a conventional network system. The conventional network system includes switches 10a to 10e for performing data transfer, user terminals 21 to 26, and a maintenance terminal 10 that performs maintenance and management of the switch 10a.

The respective switches 10a to 10e include ports for connecting to the user terminals and other switches, and each port corresponds to one physical link. The port is identified by a number such as PN (N: a natural number).

The switch 10a includes ports (communication ports) P1 to P8. The port P1 is connected to the user terminal 21, the port P2 is connected to the user terminal 22, and the ports P7 and P8 are connected to the ports P4 and P6 of the switch 10b. The switch 10a is also connected to the maintenance terminal 10.

The switch 10b includes ports P1 to P12. The port P1 is connected to the user terminal 23, the ports P4 and P6 are connected to the ports P7 and P8 of the switch 10a, and the ports P10 to P12 are connected to the ports P7, P9, and P11 of the switch 10c.

The switch 10c includes the ports P1 to P12. The ports P2 and P4 are connected to the ports P5 and P6 of the switch 10d, the ports P7, P9, and P11 are connected to the ports P10 to P12 of the switch 10b, and the port P12 is connected to the port P5 of the switch 10e.

The switch 10d includes the ports P1 to P6. The port P1 is connected to the user terminal 24, the port P2 is connected to the user terminal 25, and the ports P5 and P6 are connected to the ports P2 and P4 of the switch 10c.

The switch 10e includes the ports P1 to P5. The port P2 is connected to the user terminal 26, and the port P5 is connected to the port P12 of the switch 10c.

It is assumed that each of the switches 10a to 10e is assigned a unique media access control (MAC) address. Specifically, the MAC address of the switch 10a is 0A, the MAC address of the switch 10b is 0B, the MAC address of the switch 10c is 0C, the MAC address of the switch 10d is 0D, and the MAC address of the switch 10e is 0E. All MAC addresses are indicated in hexadecimal notation. The MAC address has actually 6 bytes; however, zeros in front are omitted.

It is also assumed herein that each of the user terminals 21 to 26 is assigned a unique MAC address as in the switches 10a to 10e. Specifically, reference number 21 is assigned to the MAC address of the user terminal 21, and 26 is assigned to the MAC address of the user terminal 26. The MAC addresses of the user terminals 22 to 25 are omitted here.

In FIG. 32, the link aggregation is used somewhere for connecting the switches. To identify a logical link formed by the link aggregation, trunk number is used. Trunk number of the logical link for connecting the switch 10a with the switch 10b is defined as a trunk 40, trunk number of the logical link for connecting the switch 10b with the switch 10c is defined as a trunk 50, and trunk number of the logical link for connecting the switch 10c with the switch 10d is defined as a trunk 60.

In the example of FIG. 32, both switches connected to one logical link use the same trunk number. However, the logical link needs only be identified in one switch, and therefore the same number need not be used by the both switches. However, in the following explanations, it is assumed that the link aggregation for connecting two switches uses the same trunk number.

Figure 33:
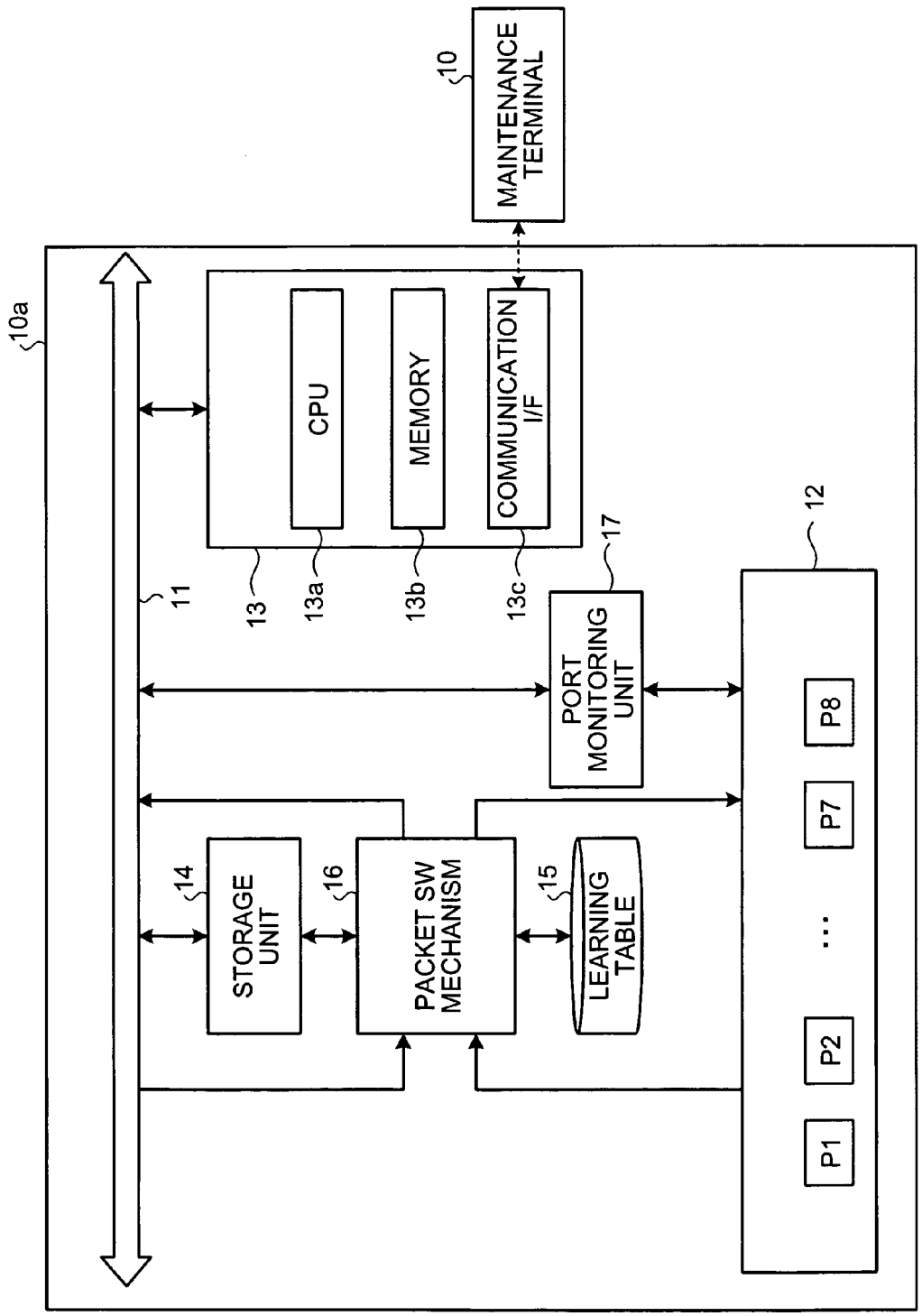
FIG. 33 is a functional block diagram of a switch shown in FIG. 32.

Explained next is a configuration of the switch 10a. Although the switches 10b to 10e have different number of ports than the switch 10a, the switches 10b to 10e can be of the same configuration as the switch 10a, and thus only the switch 10a is described in detail below. FIG. 33 is a functional block diagram of the switch 10a. The switch 10a includes a bus 11, a communication port group 12, a setting controller 13, a storage unit 14, a learning table 15, a packet SW mechanism 16, and a port monitoring unit 17.

The bus 11 connects the setting controller 13, the storage unit 14, the packet SW mechanism 16, and the port monitoring unit 17 with each other. The communication port group 12 includes the ports P1 to P8.

The setting controller 13 controls the entire switch 10a, and includes a central processing unit (CPU) 13a, a memory 13b, and a communication I/F 13c. The CPU 13a performs various processes by executing computer programs, and the memory 13b stores therein the computer programs to be executed by the CPU 13a and data necessary for the computer programs.

The communication I/F 13c receives a command from the maintenance terminal 10 used by an administrator and sends the command to the CPU 13a, and sends back an execution result of the command to the maintenance terminal 10.

The storage unit 14 stores therein a port management table and a link-aggregation management table. The port management table is explained first. The port management table manages information of the link aggregation ports and the like. FIG. 34 is one example of data structure of the conventional port management table.

As shown in FIG. 34, the port management table includes port number, link-aggregation target flag, trunk number, and flooding target flag. The link-aggregation target flag indicates whether a port constitutes a link aggregation. When the link-aggregation target flag is set to "0", it indicates that a port does not constitute a link aggregation. When the link-aggregation target flag is set to "1", it indicates that a port constitutes a link aggregation.

In the example of FIG. 34, ports with port numbers 7 and 8 constitute a link aggregation, and trunk number is "40". The flooding target flag indicates whether to perform flooding. Flooding represents outputting the packet to all ports other than the port having received the packet. When the flooding target flag is set to "1", it indicates that the port executes flooding. When the flooding target flag is set to "0", it indicates that the port does not execute flooding.

The link-aggregation management table manages the trunk constituting the link aggregation. FIG. 35 is one example of data structure of the conventional link-aggregation management table. As shown in FIG. 35, the link aggregation-management table includes trunk number, the number of ports in trunk, and first port number to n-th port number.

The number of ports in the trunk indicates the number of ports constituting the trunk. For example, the trunk with trunk number "40" includes two ports, and the first port number is "7", and second port number is "8".

Figure 36:
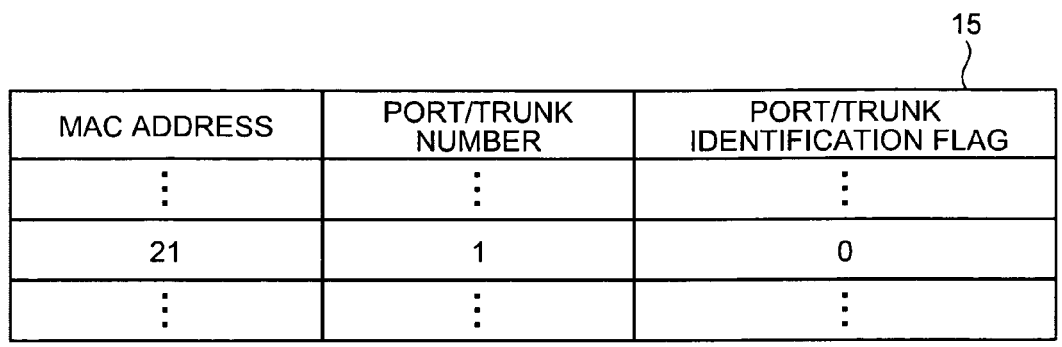
FIG. 36 is one example of data structure of a conventional learning table.

Referring back to FIG. 33, sender address of the packet received in the past is stored in the learning table 15 in association with identification information of the port having received the packet or of the trunk. FIG. 36 is one example of data structure of the learning table 15.

As shown in FIG. 36, the learning table 15 includes MAC address, port/trunk number, and port/trunk identification flag. The port/trunk identification flag is information indicating whether the port/trunk number is a port number or a trunk number. When the port/trunk identification flag is set to "0", the port/trunk number in a corresponding line indicates the port number. When the port/trunk identification flag is set to "1", the port/trunk number in the corresponding line indicates the trunk number.

For example, when the user terminal 21 transmits a packet having the number 21 as the sender MAC address to the switch 10a, 21 as the MAC address, 1 as the port/trunk number, and 0 as the port/trunk identification flag are stored in the leaning table 15 of the switch 10a.

Referring back to FIG. 33, upon receipt of the packet from the communication port group 12 or the bus 11, the packet SW mechanism 16 determines a transfer destination of the packet according to the type of the packet and a reference result of the learning table 15, and transfers the packet to the communication port group 12 or the bus 11.

When the determined transfer destination is a trunk, the packet SW mechanism 16 refers to the port management table and the link-aggregation management table stored in the storage unit 14, to determine a specific communication port to be used for transfer. Thereafter, the packet SW mechanism 16 outputs the packet to the communication port group 12.

The port monitoring unit 17 monitors the communication port group 12, and detects a fault or recovery of the communication ports P1 to P8 and the physical link connected to the communication ports P1 to P8. When the fault or recovery of the physical link is detected, the port monitoring unit 17 outputs a detection result to the setting controller 13.

When a fault occurs in the link aggregation port, the port monitoring unit 17 outputs information of the failed port to the setting controller 13, and updates the port management table, upon receipt of an instruction from the setting controller 13. For example, the port monitoring unit 17 rewrites the flooding target flag of a normal port in the same trunk as the failed port to "1".

When a fault occurs in the link aggregation port, the port monitoring unit 17 outputs the information of the failed port to the setting controller 13, and updates the link-aggregation management table, upon receipt of an instruction from the setting controller 13.

That is, the port monitoring unit 17 reduces the number of normal ports in the trunk to remove the failed port from the respective port numbers constituting the trunk, and resets to left-align the port numbers. When the failed port is recovered, the port monitoring unit 17 increases the number of normal ports in the trunk, adds the recovered port to the port information constituting the trunk, and resets to left-align the port numbers.

Figure 37:
FIG. 37 is one example of data structure of a packet.

The data structure of the packet transferred between the switches 10a to 10e is explained next. FIG. 37 is one example of data structure of a packet. As shown in FIG. 37, a packet includes a destination MAC address, a sender MAC address, a virtual local area network (VLAN) tag, payload, and a frame check sequence (FCS).

The destination MAC address uniquely identifies a communication interface of an apparatus at a destination. The sender MAC address uniquely identifies the communication interface included in a sender apparatus. The VLAN tag is a unique value assigned to an individual logic network when one network is divided into a plurality of logic networks and operated.

The payload is a data body to be sent and received, and for example, is the data body obtained by dividing an IP packet into a predetermined data length. The FCS is a value used for detecting an error in the received packet. The packet as shown in FIG. 37 is transferred between respective switches or between the switch and the user terminal via the ports P1 to P8. There are various modifications of the data structure of the packet according to the operational requirements of the network. For example, the VLAN tag can be omitted, or header information can be added in addition to the contents shown in FIG. 37.

Figure 38:
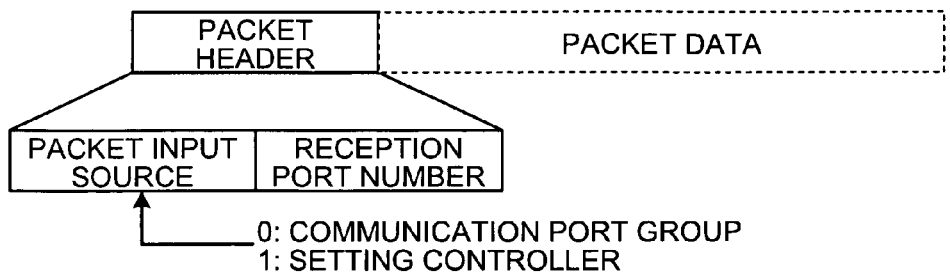
FIG. 38 is one example of data structure of a packet header.

Explained next is a header of the packet shown in FIG. 37. FIG. 38 is one example of data structure of the packet header. As shown in FIG. 38, the packet header includes a packet input source and a reception port number. When the packet is obtained from the communication port group, "0" is registered as the packet input source. When the packet is obtained from the setting controller 13, "1" is registered as the packet input source. The port number having received the packet is registered as the reception port number. The packet SW mechanism 16 refers to the packet header to determine the input source of the packet.

Figure 39:
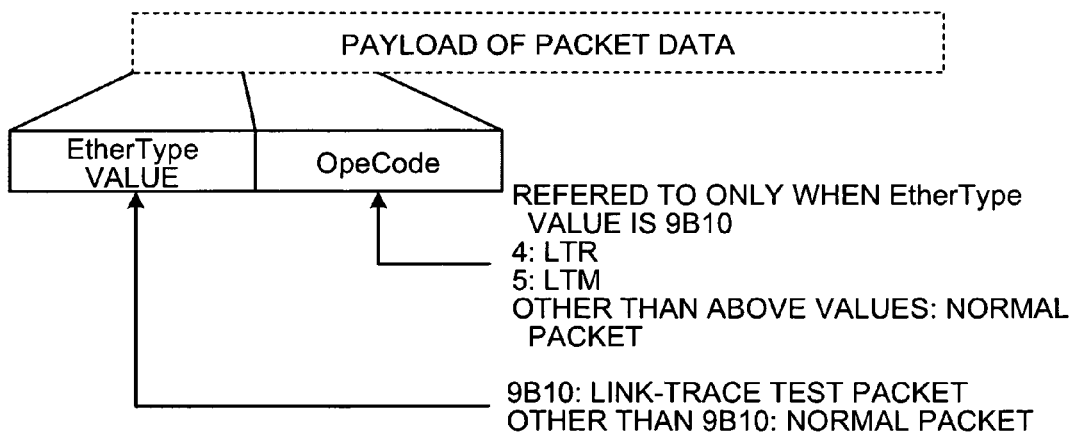
FIG. 39 is a schematic diagram for explaining an Ether-Type value and an OpeCode included in a payload of the packet.

FIG. 39 is a schematic diagram for explaining the EtherType value and the OpeCode included in the payload of the packet. The packet SW mechanism 16 refers to the EtherType value and the OpeCode to determine the type of the packet.

Specifically, when the EtherType value is "0x9B10" and the OpeCode is "5", the packet type is a link-trace message (LTM). When the EtherType value is "0x9B10" and the opeCode is "4", the packet type is a link-trace reply (LTR). When the EtherType value is other than "0x9B10", or when the EtherType value is "0x9B10" and the OpeCode is other than "4" and "5", the packet is a normal packet.

The switch outputs LTM to collect path information of the packet, and receives LTR in response to the LTM.

Figure 40:
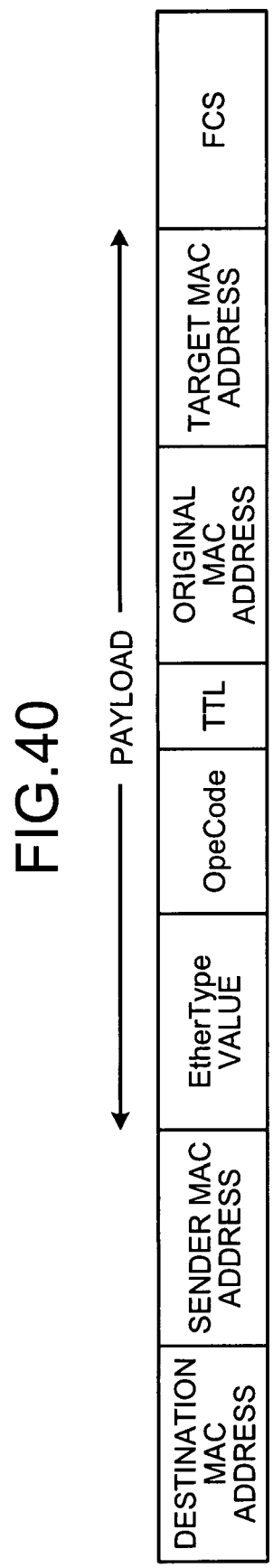
FIG. 40 is one example of data structure of a link-trace message packet.
Figure 41:
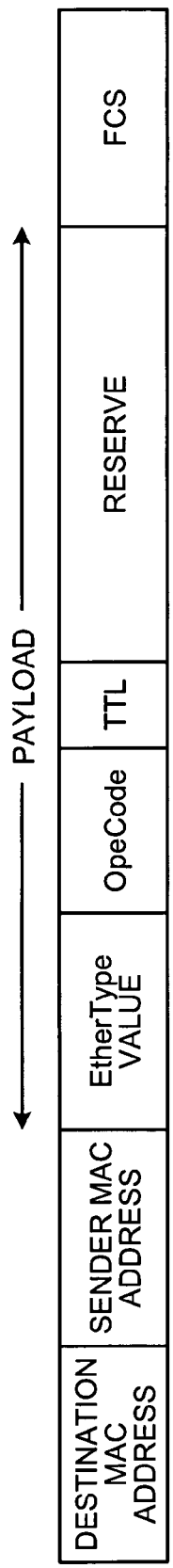
FIG. 41 is one example of data structure of a link-trace reply packet.

FIG. 40 is one example of data structure of a link-trace message packet. FIG. 41 is one example of data structure of a link-trace reply packet. As shown in FIG. 40, a link-trace message packet includes a destination MAC address, a sender MAC address, an EtherType value, an OpeCode, Time To Live (TTL), an original MAC address, a target MAC address, and FCS. As shown in FIG. 41, the link-trace reply packet includes the destination MAC address, sender MAC address, EtherType value, OpeCode, TTL, and FCS.

The EtherType value indicates the packet type, and is used for identifying the link-trace packet. In the case of link-trace packet, "0x9B10" in hexadecimal notation is used as the EtherType value. In other cases, the packet is regarded as the normal packet. For the OpeCode, "5" is registered in the case of link-trace message packet.

TTL is used for indicating a distance between a tested apparatus and a responded apparatus. For the original MAC address, the MAC address of the own apparatus, or an address of the sender port of the packet is registered. The original MAC address is used only in LTM, and is not used in LTR. For the target MAC address, a value set as the target MAC address by a command is registered. The target MAC address is used only in LTM, and is not used in LTR.

Figure 42:
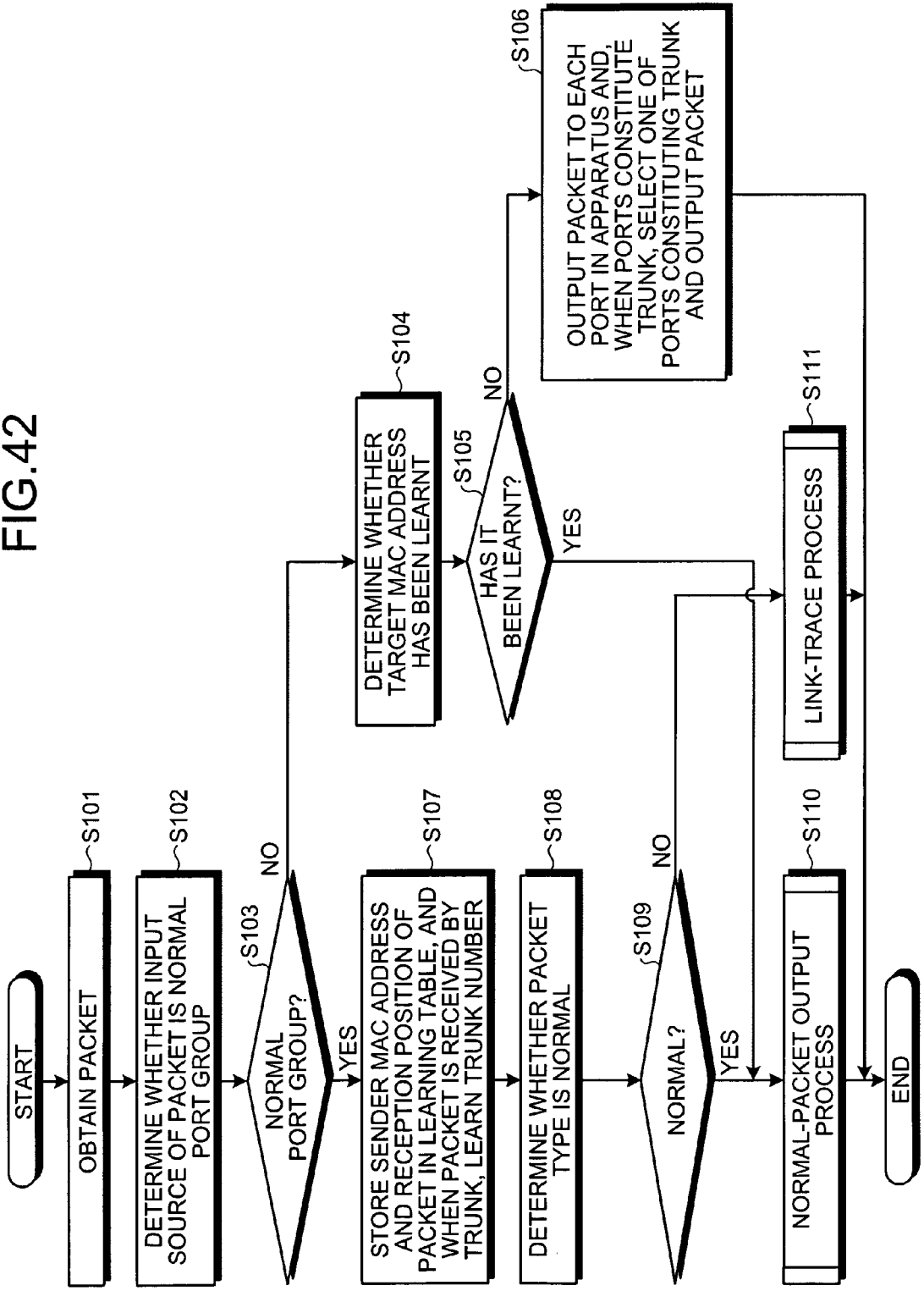
FIG. 42 is a flowchart of a process procedure performed by a conventional packet SW mechanism.

FIG. 42 is a flowchart of a process procedure performed by the conventional packet SW mechanism. Although not mentioned, the packet SW mechanism of the switches 10b to 10e operates in the same manner as the packet SW mechanism 16. As shown in FIG. 42, in the switch 10a, the packet SW mechanism 16 obtains a packet (Step S101), and refers to the packet header (see FIG. 38) to determine whether the input source of the packet is a normal port group (Step S102).

When the input source is not a normal port group (NO at Step S103), the packet SW mechanism 16 determines whether the target MAC address has already been learnt (Step S104). When the target MAC address has not yet been learnt (NO at Step S105), the packet SW mechanism 16 outputs the packet to respective ports P1 to P8 in the apparatus (excluding the reception port). When output destination ports constitute a trunk, the packet SW mechanism 16 selects one of the ports constituting the trunk and outputs the packet thereto (Step S106). On the other hand, when the target MAC address has already been learnt (YES at Step S105), the process control proceeds to Step S110, explained later.

When the input source of the packet is a normal port group (YES at Step S103), the packet SW mechanism 16 learns the sender MAC address and a reception position (port number) of the packet, and stores them in the learning table 15. When the packet is received by the trunk, the packet SW mechanism 16 learns the trunk number (Step S107).

The packet SW mechanism 16 refers to the EtherType value and the OpeCode of the packet (see FIG. 39) to determine the packet type (Step S108). When the packet is a normal packet (YES at Step S109), the packet SW mechanism 16 performs a normal-packet output process (Step S110). On the other hand, when the packet is not a normal packet, i.e., when the packet is LTM or LTR (NO at Step S109), the packet SW mechanism 16 performs a link-trace process (Step S111).

Figure 43:
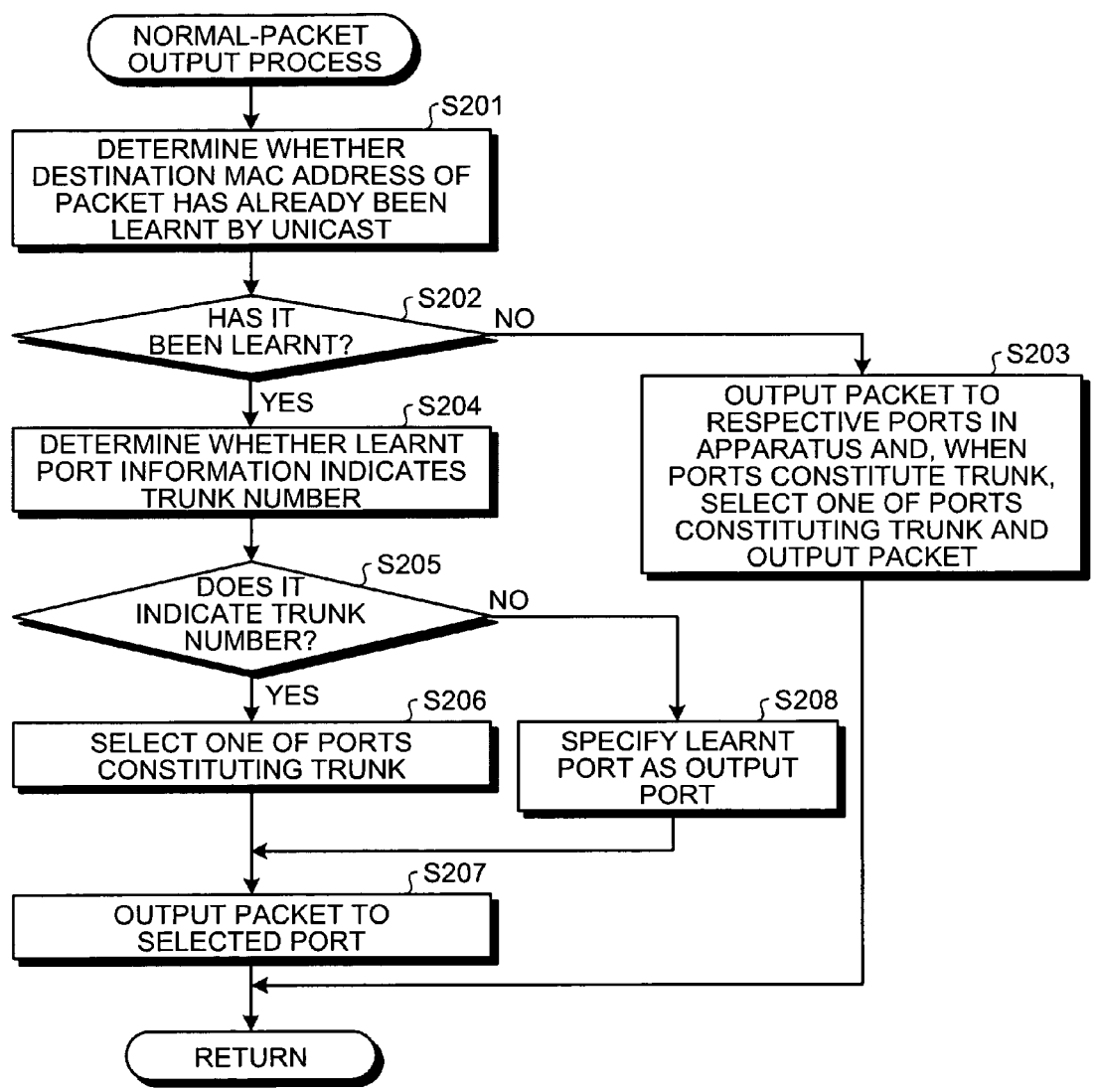
FIG. 43 is a detailed flowchart of a normal-packet output process shown in FIG. 42.

FIG. 43 is a detailed flowchart of the normal-packet output process performed at Step S110 in FIG. 42. As shown in FIG. 43, the packet SW mechanism 16 determines whether the destination MAC address of the packet has already been learnt by unicast referring to the learning table 15 (Step S201). When the address has not yet been learnt (NO at Step S202), the packet SW mechanism 16 outputs the packet to respective ports P1 to P8 in the apparatus (excluding the reception port). When output destination ports constitute a trunk, the packet SW mechanism 16 selects one of the ports constituting the trunk and outputs the packet thereto (Step S203).

On the other hand, when the address has already been learnt (YES at Step S202), the packet SW mechanism 16 determines whether the learnt port information indicates a trunk number (Step S204). When the information indicates a trunk number (YES at Step S205), the packet SW mechanism 16 selects one of the ports constituting the trunk (Step S206) and outputs the packet to the selected port (Step S207). On the other hand, when the learnt port information does not indicate a trunk number (NO at Step S204), the packet SW mechanism 16 specifies the learnt port as the output port (Step S208), and the process control proceeds to Step S207.

Figure 44:
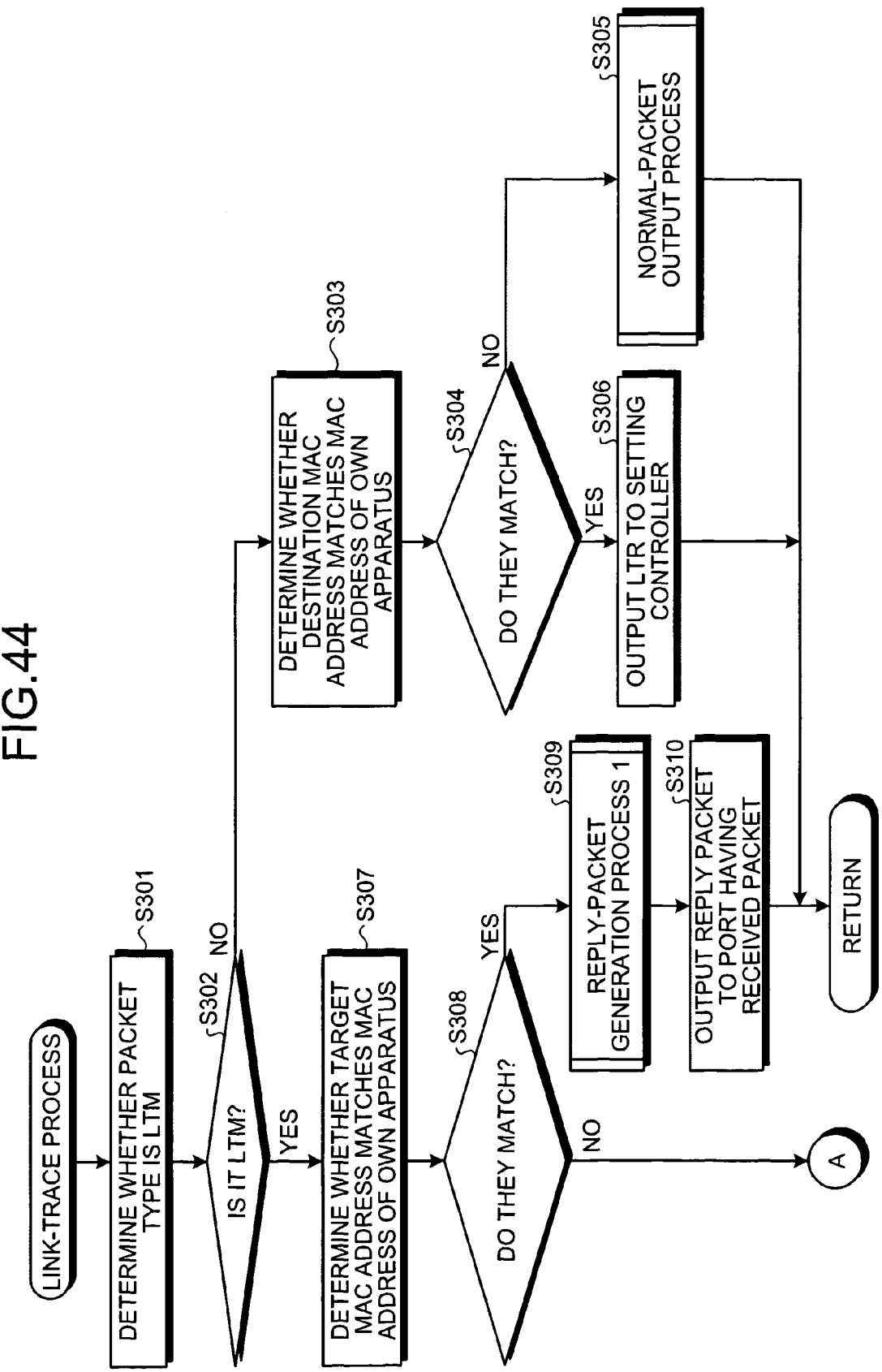
FIGS. 44 and 45 are detailed flowchart of a link-trace process shown in FIG. 42.
Figure 45:
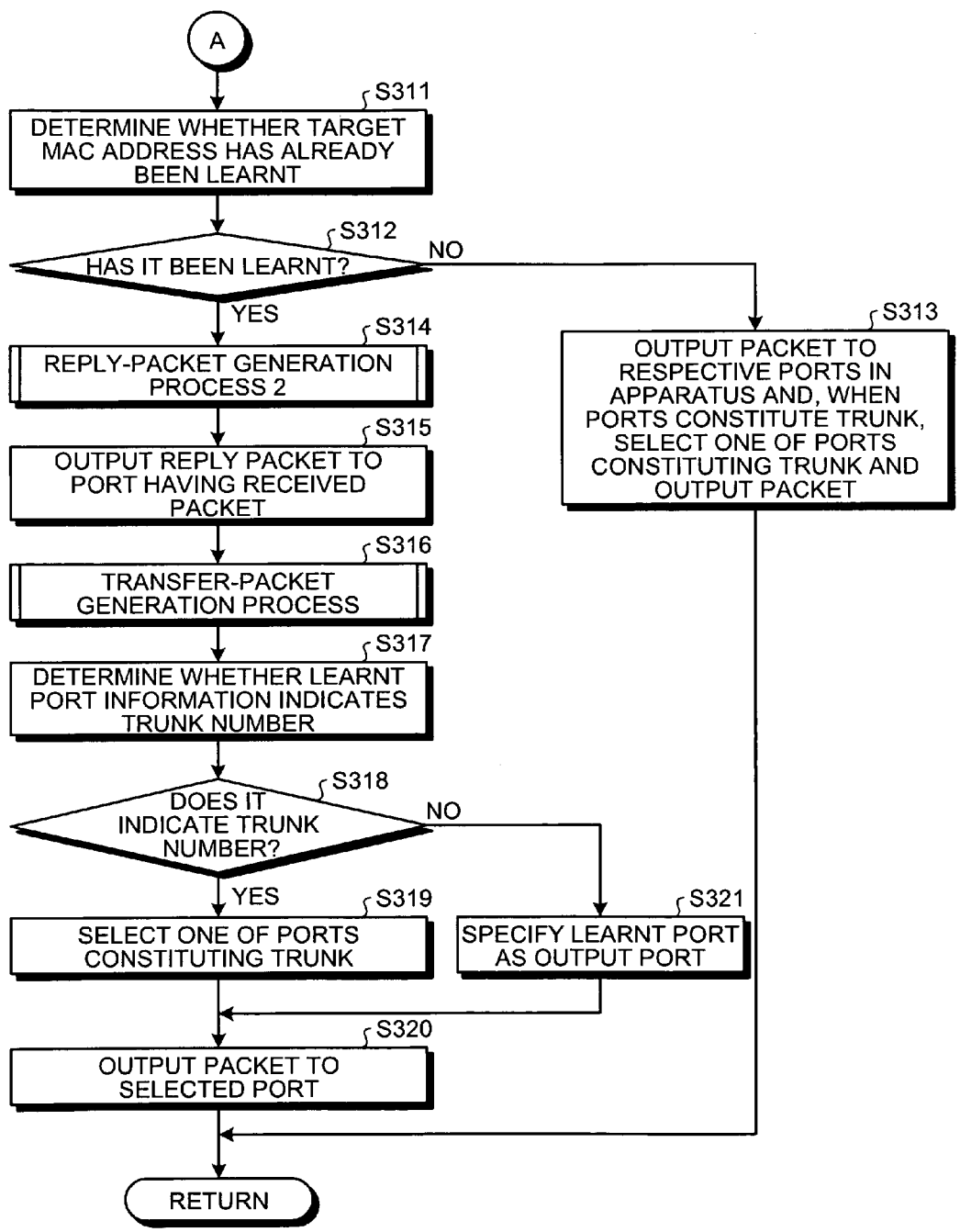

FIGS. 44 and 45 are detailed flowcharts of the link-trace process performed at Step S111 in FIG. 42. As shown in FIG. 44, the packet SW mechanism 16 determines whether the packet type is LTM (Step S301). When the packet type is LTR (NO at Step S302), the packet SW mechanism 16 determines whether the destination MAC address matches the MAC address of the own apparatus (Step S303).

When the addresses do not match (NO at Step S304), the packet SW mechanism 16 performs the normal-packet output process (Step S305). On the other hand, when the addresses match (YES at Step S304), the packet SW mechanism 16 outputs LTR to the setting controller 13 (Step S306).

When the packet type is LTM (YES at Step S302), the packet SW mechanism 16 determines whether the target MAC address matches the MAC address of the own apparatus (Step S307). When the target MAC address matches the MAC address of the own apparatus (YES at Step S308), the packet SW mechanism 16 performs a reply-packet generation process 1 (Step S309), and outputs a reply packet to the port having received the packet (Step S310).

When the target MAC address does not match the MAC address of the own apparatus (NO at Step S308), the packet SW mechanism 16 determines whether the target MAC address has already been learnt (Step S311). When the target MAC address has not yet been learnt (NO at Step S312), the packet SW mechanism 16 outputs the packet to respective ports P1 to P8 in the apparatus (excluding the reception port). When output destination ports constitute a trunk, the packet SW mechanism 16 selects one of the ports constituting the trunk and outputs the packet thereto (Step S313).

On the other hand, when the target MAC address has already been leant (YES at Step S312), the packet SW mechanism 16 performs a reply-packet generation process 2 (Step S314), outputs a reply packet to the port having received the packet (Step S315), and performs a transfer-packet generation process (Step S316).

The packet SW mechanism 16 then determines whether the learnt port information indicates a trunk number (Step S317). When the port information indicates a trunk number (YES at Step S318), the packet SW mechanism 16 selects one of the ports constituting the trunk (Step S319), and outputs the packet to the selected port (Step S320). On the other hand, when the learnt port information does not indicate a trunk number (NO at Step S318), the packet SW mechanism 16 specifies the learnt port as the output port (Step S321), and the process control proceeds to Step S320.

The normal-packet output process at Step S305 is performed in the same manner as previously described in connection with FIG. 43, and the same explanation is not repeated.

Figure 46:
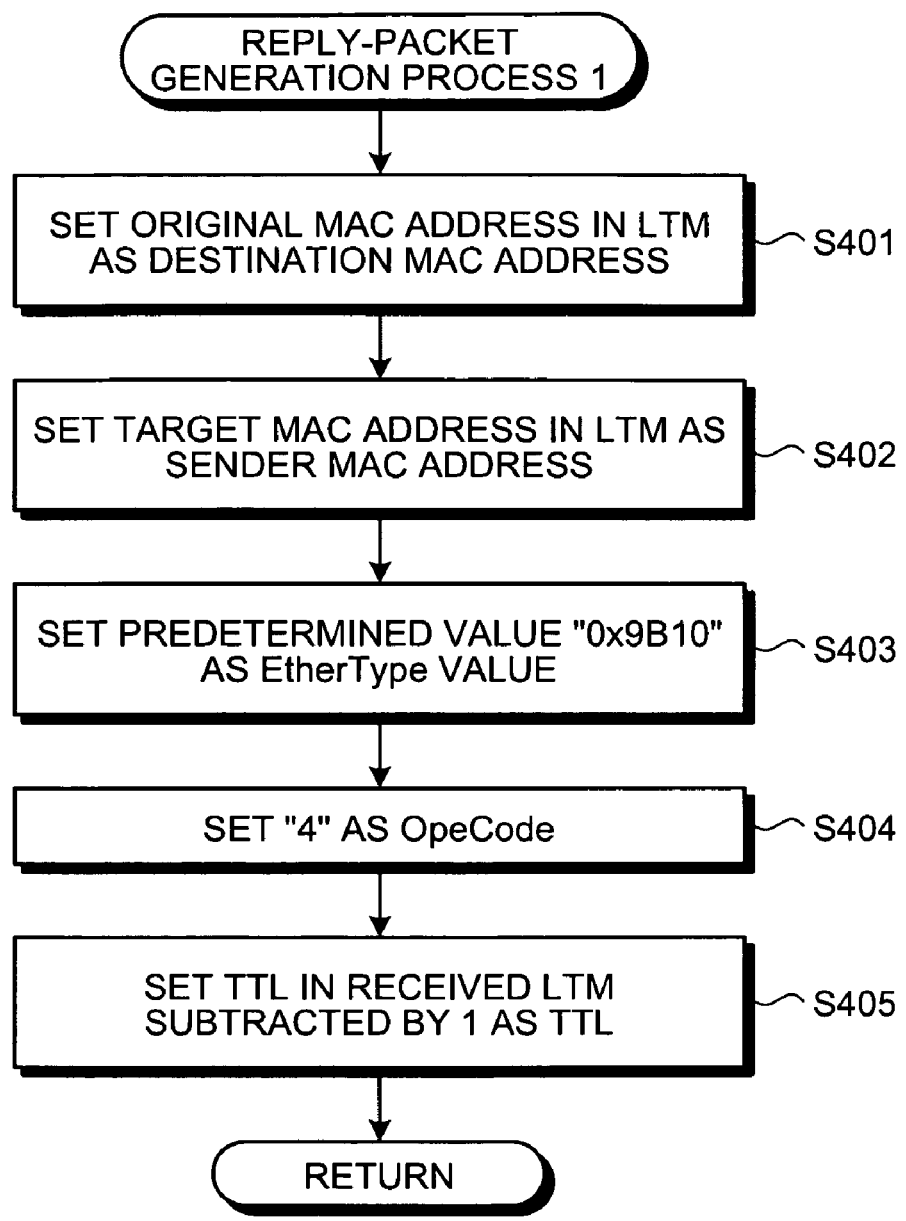
FIG. 46 is a detailed flowchart of a reply-packet generation process 1 shown in FIG. 44.

FIG. 46 is a detailed flowchart of the reply-packet generation process 1 performed at Step S309 in FIG. 44. As shown in FIG. 46, the packet SW mechanism 16 sets the original MAC address of LTM as the destination MAC address (Step S401), and sets the target MAC address of LTM as the sender MAC address (Step S402).

The packet SW mechanism 16 sets a predetermined value "0x9B10" as the EtherType value (Step S403), sets "4" as the OpeCode (Step S404), and sets TTL of received LTM subtracted by 1 as the TTL value (Step S405).

Figure 47:
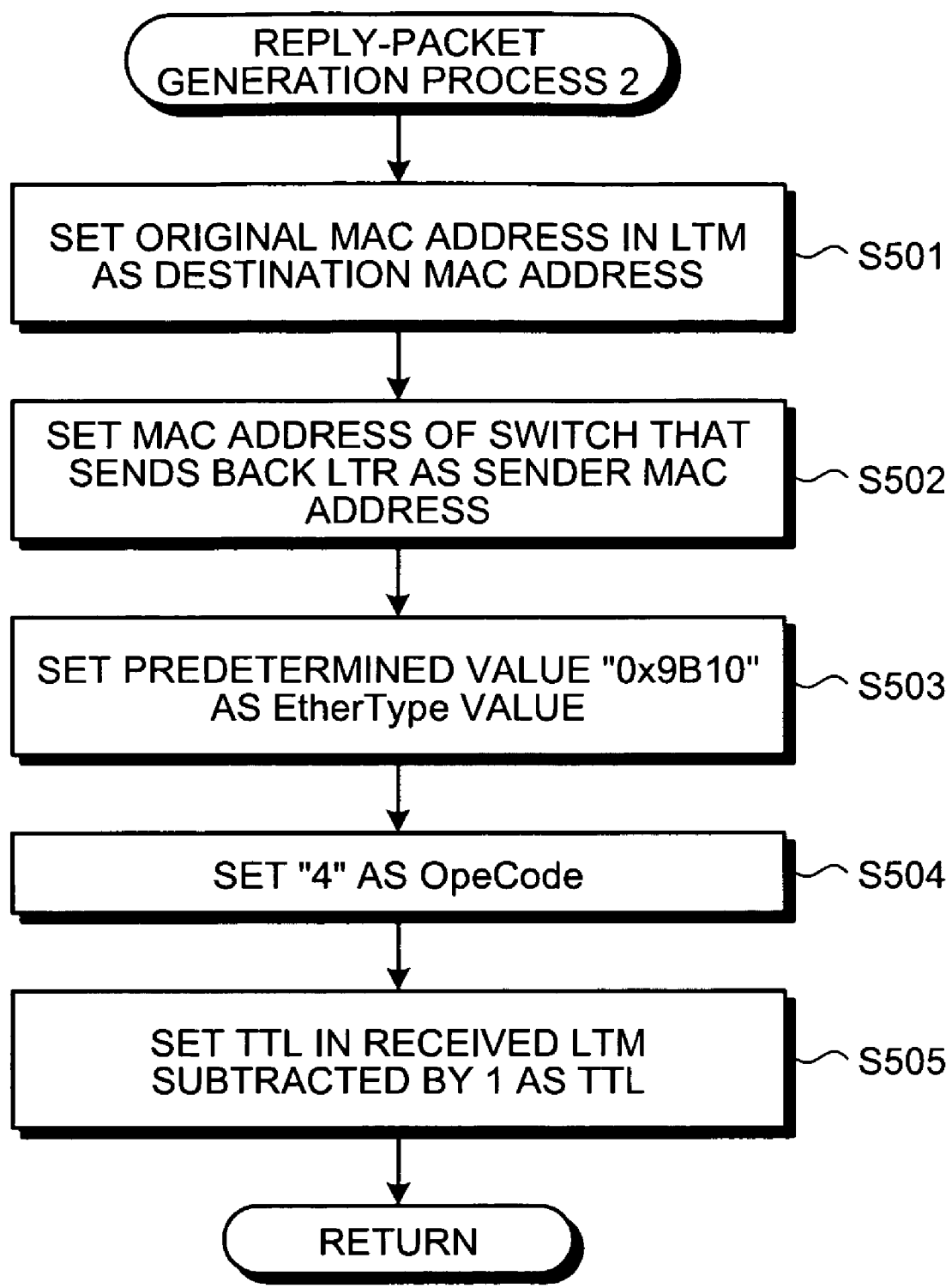
FIG. 47 is a detailed flowchart of a reply-packet generation process 2 shown in FIG. 45.

FIG. 47 is a detailed flowchart of the reply-packet generation process 2 performed at Step S314 in FIG. 45. As shown in FIG. 47, the packet SW mechanism 16 sets the original MAC address of LTM as the destination MAC address (Step S501), and sets the MAC address of a switch that sends back LTR as the sender MAC address (Step S502).

The packet SW mechanism 16 sets a predetermined value "0x9B10" as the EtherType value (Step S503), sets "4" as the OpeCode (Step S504), and sets TTL of received LTM subtracted by 1 as the TTL value (Step S505).

Figure 48:
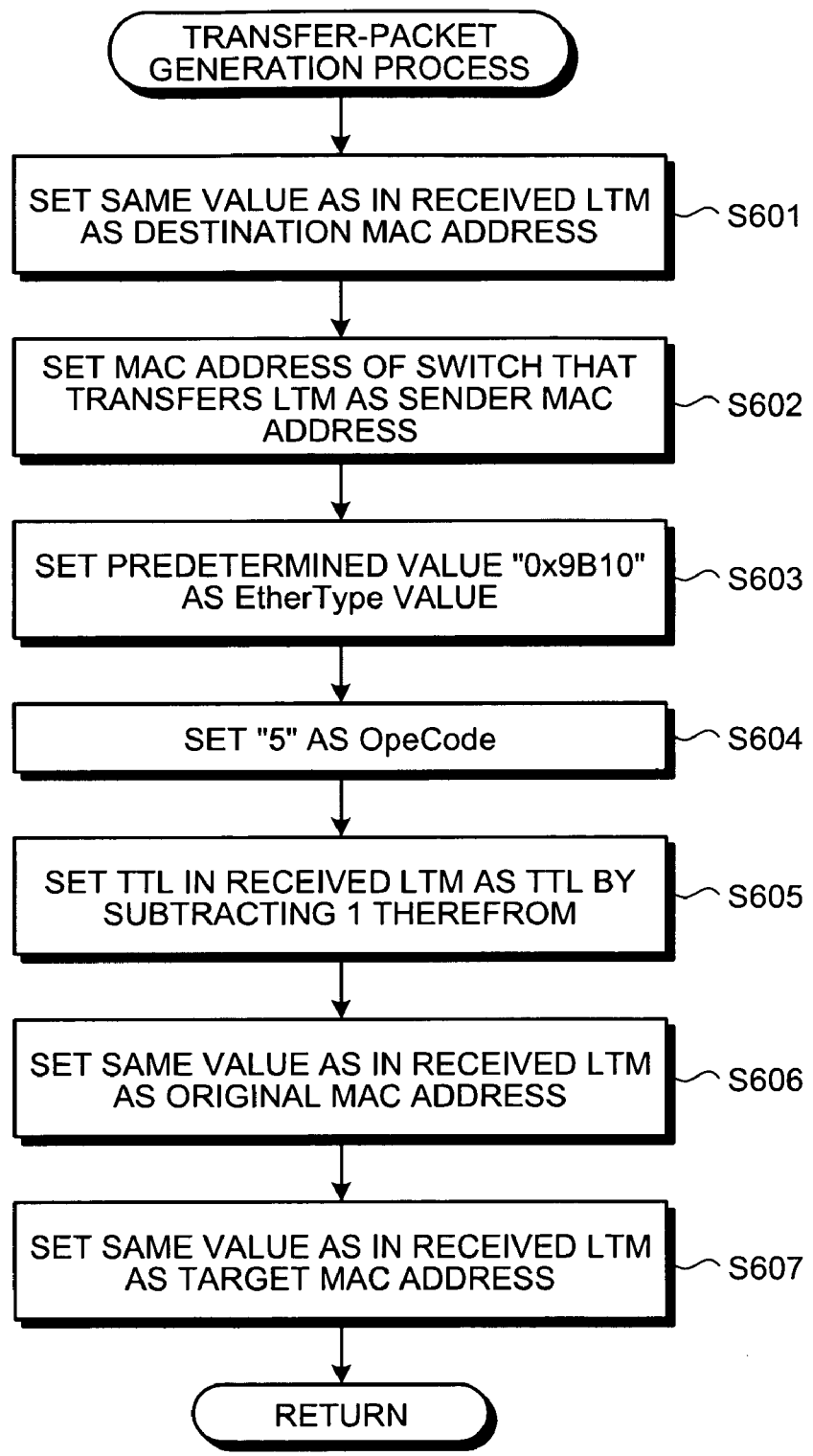
FIG. 48 is a detailed flowchart of a transfer-packet generation process shown in FIG. 45.

FIG. 48 is a detailed flowchart of the transfer-packet generation process performed at Step S316 in FIG. 45. As shown in FIG. 48, the packet SW mechanism 16 sets the same value as in received LTM as the destination MAC address (Step S601), and sets the MAC address of the switch that transfers the LTM as the sender MAC address (Step S602).

The packet SW mechanism 16 then sets a predetermined value "0x9B10" as the EtherType value (Step S603), sets "5" as the OpeCode (Step S604), and sets TTL of received LTM subtracted by 1 as the TTL value (Step S605). Thereafter, the packet SW mechanism 16 sets the same value as in received LTM as the original MAC address (Step S606), and sets the same value as in received LTM as the target MAC address (Step S607).

In the conventional network system, therefore, because the respective switches 10a to 10e respectively perform the processes shown in FIGS. 42 to 48, the path search can be made. For example, when the path from the switch 10a to the switch 10e is searched for (when transmission is performed by setting the destination MAC address of LTM as the MAC address of the switch 10e, and the sender MAC address of LTM as the MAC address of the switch 10a), the switch 10a obtains LTR from respective switches 10b to 10e. The setting controller 13 generates link-trace result data based on obtained TTL and the sender MAC address in LTR by arranging TTLs in decreasing order of size.

FIG. 49 is one example of conventional link-trace result data. The administrator can recognize the path from a sender to a destination by outputting link-trace result data as shown in FIG. 49 to a monitor (not shown) or the like.

However, as shown in FIG. 49, even if the administrator can recognize the path between respective switches 10a to 10e, he cannot recognize which section is connected by the link aggregation. Further, when LTM is transferred between respective switches 10a to 10e, LTM is transferred only to one of physical links constituting a link aggregation. Therefore, the administrator cannot recognize whether the physical links constituting the link aggregation is transferring packets normally.

Figure 1:
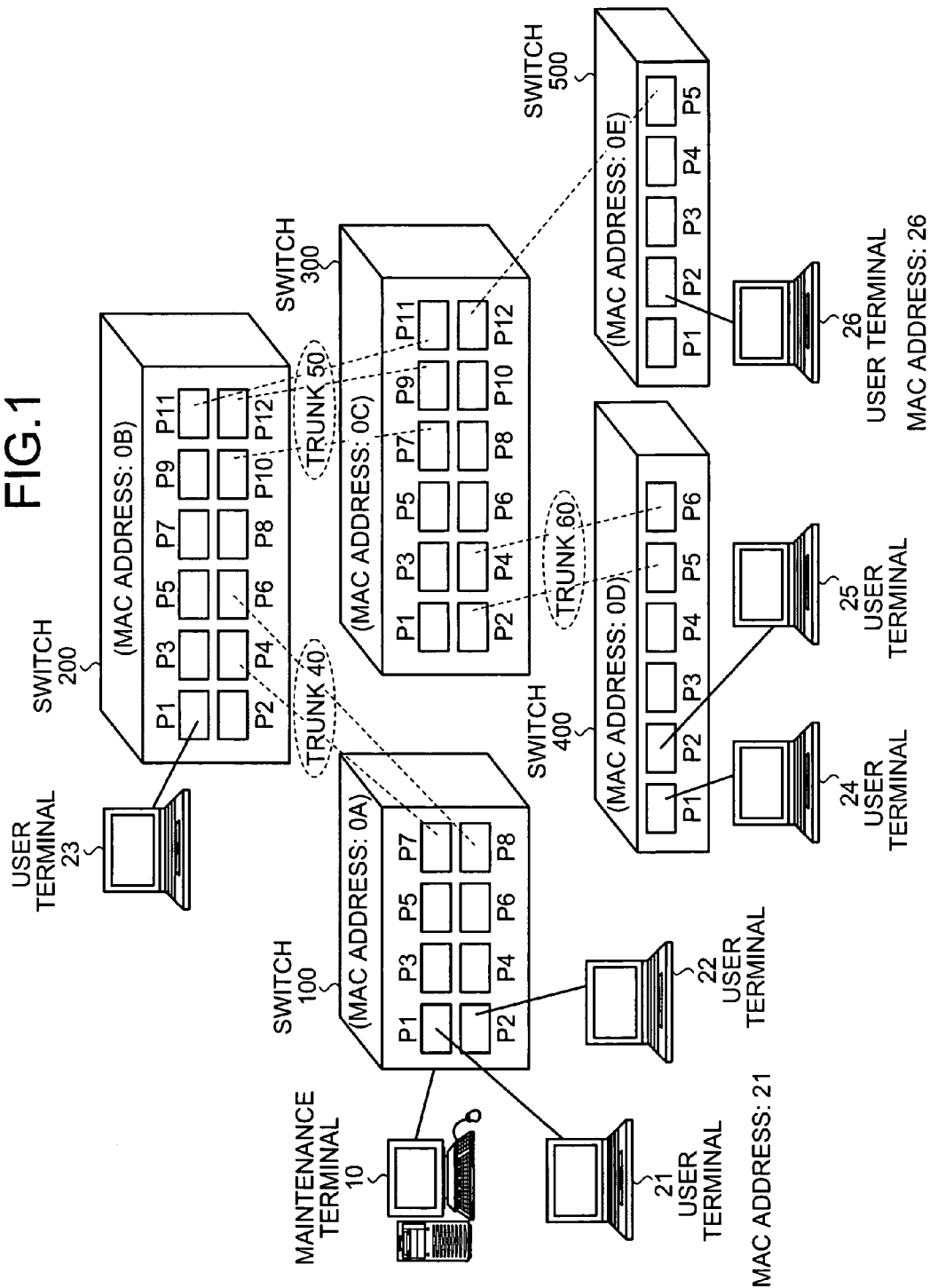
FIG. 1 depicts a configuration of a network system according to a first embodiment.

FIG. 1 is a schematic diagram of a network system according to a first embodiment. The network system of the first embodiment includes switches 100 to 500 that perform data transfer, user terminals 21 to 26, and the maintenance terminal 10 that performs maintenance and management of the switch 100.

The respective switches 100 to 500 include ports for connecting to the user terminals and other switches, and each port corresponds to one physical link. The port is identified by a number such as PN (N: a natural number).

The switch 100 includes the ports P1 to P8. The port P1 is connected to the user terminal 21, the port P2 is connected to the user terminal 22, and the ports P7 and P8 are connected to the ports P4 and P6 of the switch 200. The switch 100 is also connected to the maintenance terminal 10.

The switch 200 includes the ports P1 to P12. The port P1 is connected to the user terminal 23, the ports P4 and P6 are connected to the ports P7 and P8 of the switch 100, and the ports P10 to P12 are connected to the ports P7, P9, and P11 of the switch 300.

The switch 300 includes the ports P1 to P12. The ports P2 and P4 are connected to the ports P5 and P6 of the switch 400, the ports P7, P9, and P11 are connected to the ports P10 to P12 of the switch 200, and the port P12 is connected to the port P5 of the switch 500.

The switch 400 includes the ports P1 to P6. The port P1 is connected to the user terminal 24, the port P2 is connected to the user terminal 25, and the ports P5 and P6 are connected to the ports P2 and P4 of the switch 300.

The switch 500 includes the ports P1 to P5. The port P2 is connected to the user terminal 26, and the port P5 is connected to the port P12 of the switch 300.

It is assumed that each of the switches 100 to 500 is assigned a unique MAC address. Specifically, the MAC address of the switch 100 is 0A, the MAC address of the switch 200 is 0B, the MAC address of the switch 300 is 0C, the MAC address of the switch 400 is 0D, and the MAC address of the switch 500 is 0E. All MAC addresses are indicated in hexadecimal notation. The MAC address has actually 6 bytes; however, zeros in front are omitted.

It is also assumed herein that each of the user terminals 21 to 26 is assigned a unique MAC address as with the switches 100 to 500. Specifically, reference number 21 is assigned to the MAC address of the user terminal 21, and 26 is assigned to the MAC address of the user terminal 26. The MAC addresses of the user terminals 22 to 25 are omitted here.

In FIG. 1, the link aggregation is used somewhere for connecting the switches. To identify a logical link formed by the link aggregation, trunk number is used. Trunk number of the logical link for connecting the switch 100 with the switch 200 is defined as the trunk 40, trunk number of the logical link for connecting the switch 200 with the switch 300 is defined as the trunk 50, and trunk number of the logical link for connecting the switch 300 with the switch 400 is defined as the trunk 60.

The switches 100 to 500 respectively output a link-trace message packet to all physical links constituting the trunk, and obtain a link-trace reply packet from each physical link, in a situation where path search is made.

For example, when the switch 100 outputs LTM to the trunk 40, all the physical links P7 and P8 included in the trunk 40 output LTR in response to the LTM. Thus, the switch 100 obtains the LTR from the respective physical links P7 and P8 (respective ports P4 and P6 of the switch 200). Thus, the switch 100 can easily determine whether the physical links constituting the trunk operate normally. If LTR cannot be received from the port P7 of the switch 100, it is determined that an error occurs in the physical link connecting the port P7 of the switch 100 to the port P4 of the switch 200.

As described above, according to the first embodiment, LTM is output to all ports constituting a trunk, and LTR is received in response to the LTM from physical links. Therefore, the administrator can easily recognize the state of the physical links constituting the trunk, and thereby effectively manage respective trunks.

Figure 2:
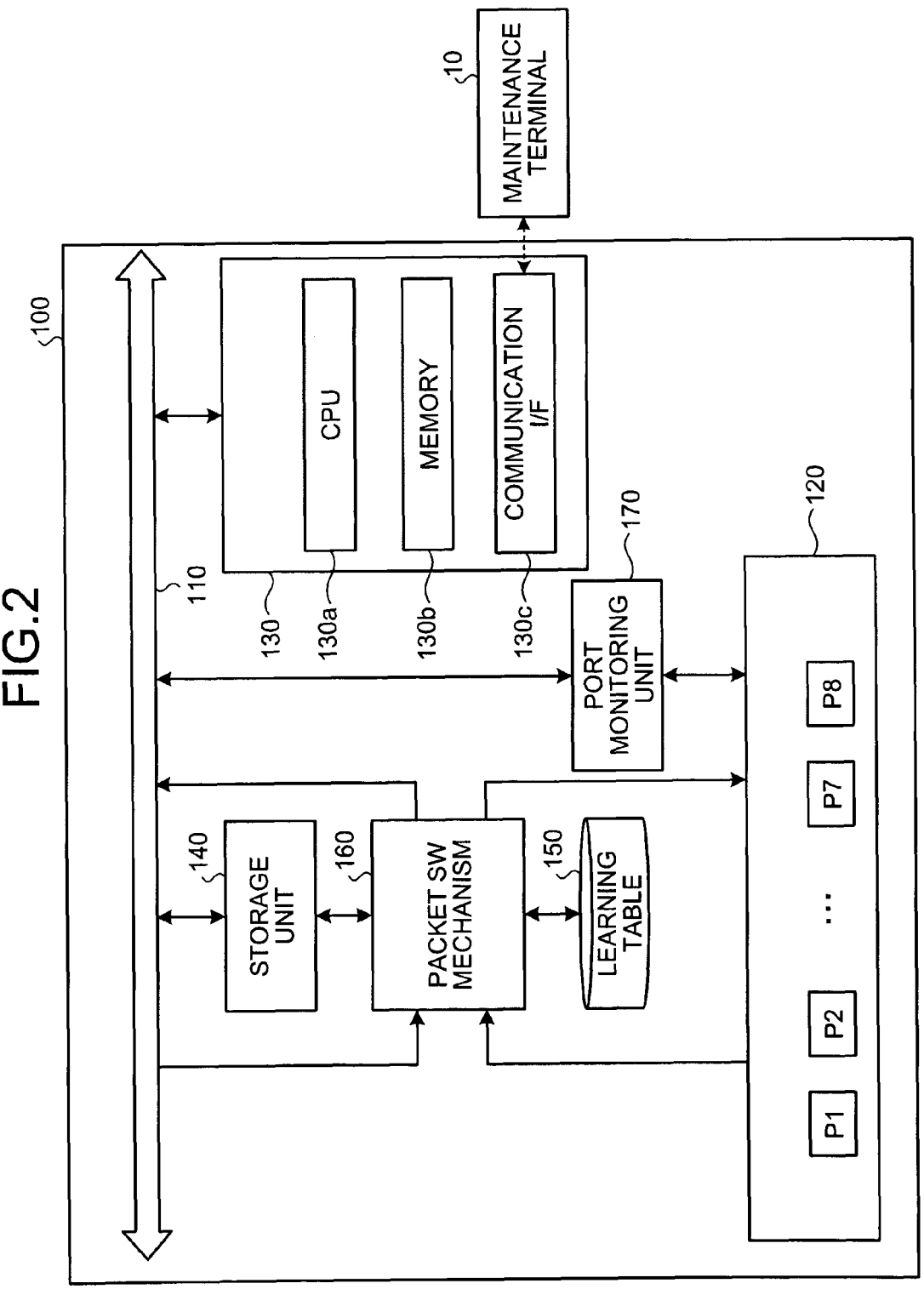
FIG. 2 is a functional block diagram of a switch shown in FIG. 1.

Explained below is the configuration of the switch 100. Although the switches 200 to 500 have different number of ports than the switch 100, the switches 200 to 500 can be of the same configuration as the switch 100, and thus only the switch 100 is described in detail. FIG. 2 is a functional block diagram of the switch 100. The switch 100 includes a bus 110, a communication port group 120, a setting controller 130, a storage unit 140, a learning table 150, a packet SW mechanism 160, and a port monitoring unit 170.

The bus 110 connects the setting controller 130, the storage unit 140, the packet SW mechanism 160, and the port monitoring unit 170 with each other. The communication port group 120 includes the ports P1 to P8, and transfers the packet to other switches or the user terminals via the ports P1 to P8.

The setting controller 130 controls the entire switch 100, and includes a CPU 130a, a memory 130b, and a communication I/F 130c. The CPU 130a performs various processes by executing computer programs, and generates the link-trace result data.

Upon receipt of LTR from the packet SW mechanism 160, the CPU 130a stores the MAC address of the LTR (sender MAC address) in the memory 130b in association with the number of LTRs with the same MAC address (sender MAC address), and generates link-trace result data referring to the memory 130b.

FIG. 3 is one example of the link-trace result data according to the first embodiment. As shown in FIG. 3, in the link-trace result data, respective MAC addresses are arranged in decreasing order of size of TTL (arranged in order of paths), and the number of times LTRs have been received (the number of connection links) is registered in association with the respective MAC addresses. The CPU 130a obtains LTR twice from the switch 200 at MAC address "0B", three times from the switch 300 at MAC address "0C", and once from the switch 500 at MAC address "0E".

That is, it can be seen from FIG. 3 that two physical links are operating normally in the trunk connecting the switch 100 and the switch 200, and three physical links are operating normally in the trunk connecting the switch 200 and the switch 300. If the number of physical links in the trunk connecting respective switches 100 to 500 is managed beforehand, the trunk having a failed physical link can be easily detected by comparing the link-trace result data generated by the CPU 130a with the number of physical links managed beforehand.

For example, when the number of connection links corresponding to the MAC address "0B" is "two", although the number of physical links in the trunk connecting the switch 100 with the switch 200 is "three", it is seen that any one of the physical links in the trunk connecting the switch 100 with the switch 200 has failed.

Referring back to FIG. 2, the memory 130b stores therein the computer programs executed by the CPU 130a and data necessary for the computer programs. Particularly, in the memory 130b, the link-trace result data and the like are stored. The communication I/F 130c receives a command from the maintenance terminal 10 used by the administrator, notifies the CPU 130a of the command, and sends back an execution result with respect to the command (for example, the link-trace result data) to the maintenance terminal 10.

The storage unit 140 stores therein a port management table and a link-aggregation management table. The port management table manages information on the link aggregation ports and the like. The data structure of the port management table according to the first embodiment is basically the same as previously described in connection with FIG. 34, and the same explanation is not repeated.

The link-aggregation management table manages the trunk constituting the link aggregation. FIG. 4 is one example of data structure of the link-aggregation management table. As shown in FIG. 4, the link aggregation-management table includes trunk number, the number of ports in trunk, first to n-th port number, and LTM-transfer flag.

The trunk number, the number of ports in trunk, the first to n-th port number are the same as those of the conventional link-aggregation management table shown in FIG. 35. The LTM-transfer flag is used for preventing the same LTM from being transferred to the destination a plurality of times when a plurality of LTMs is received by the trunk having the same trunk number.

When LTM is first received by one of ports constituting a trunk (when the corresponding LTM flag is set to "0"), after the LTM is transferred to the destination, the LTM-transfer flag of the corresponding trunk number is set to "1". Thereafter, when LTM is received from the same trunk, if the corresponding LTM-transfer flag is set to "1", LTM transfer is suspended. The LTM-transfer flag is reset to "0" after a predetermined time has elapsed from when it is set to "1".

Referring back to FIG. 2, the learning table 150 stores therein the sender address of the packet received in the past, and identification information of the port or the trunk having received the packet in association with each other. The data structure of the learning table 150 is the same as that of the learning table 15 shown in FIG. 36, and the same explanation is not repeated.

Upon receipt of the packet from the communication port group 120 or the bus 110, the packet SW mechanism 160 determines a transfer destination of the packet according to the packet type and the reference result of the learning table 150 and transfers the packet to the communication port group 120 or the bus 110.

Particularly, upon transferring LTM to a destination, the packet SW mechanism 160 outputs the LTM, when the transfer destination ports constitute a trunk, to all the ports constituting the trunk. Further, the packet SW mechanism 160 manages the link-aggregation management table shown in FIG. 4, and updates the LTM-transfer flag according to the condition.

That is, when LTM is output to all ports of a trunk, the packet SW mechanism 160 sets the LTM-transfer flag of the corresponding trunk number to "1". After a predetermined time has passed from when the LTM-transfer flag is set to "1", the packet SW mechanism 160 resets the LTM-transfer flag to "0".

The port monitoring unit 170 monitors the communication port group 120, and detects a fault or recovery of the communication ports P1 to P8 and the physical link connected to the communication ports P1 to P8. When the fault or recovery of the physical link is detected, the port monitoring unit 170 outputs a detection result to the setting controller 130.

When a fault occurs in the link aggregation port, the port monitoring unit 170 outputs information of the failed port to the setting controller 130, and updates the port management table, upon receipt of an instruction from the setting controller 130. For example, the port monitoring unit 170 rewrites the flooding target flag of a normal port in the same trunk as the failed port to "1".

When a fault occurs in the link aggregation port, the port monitoring unit 170 outputs the information of the failed port to the setting controller 130, and updates the link-aggregation management table, upon receipt of an instruction from the setting controller 130. That is, the port monitoring unit 170 reduces the number of normal ports in the trunk to remove the failed port from the respective port numbers constituting the trunk, and resets to left-align the port numbers. When the failed port is recovered, the port monitoring unit 170 increases the number of normal ports in the trunk, adds the recovered port to the port information constituting the trunk, and resets to left-align the port numbers.

The data structure of the packet transferred between the respective switches 100 to 500 is the same as those shown in FIGS. 37 to 41, and the same explanation is not repeated.

Figure 5:
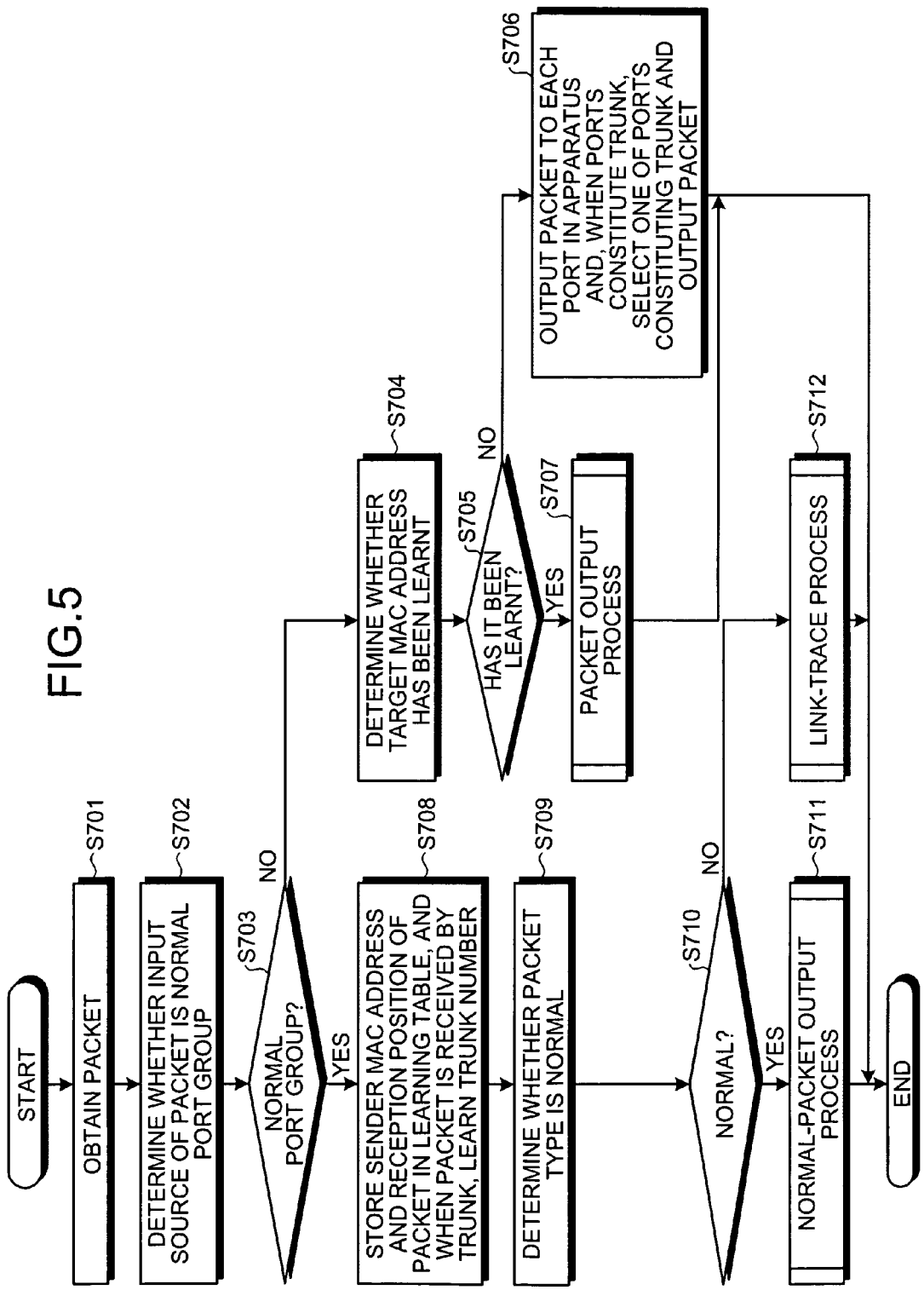
FIG. 5 is a flowchart of a process procedure performed by a packet SW mechanism shown in FIG. 2.

FIG. 5 is a flowchart of a process procedure performed by the packet SW mechanism 160. Although not mentioned, the packet SW mechanism of the switches 100 to 500 operates in the same manner as the packet SW mechanism 160. As shown in FIG. 5, in the switch 100, the packet SW mechanism 160 obtains a packet (Step S701), and determines whether the input source of the packet is a normal port group (Step S702).

When the input source is not a normal port group (NO at Step S703), the packet SW mechanism 160 determines whether the target MAC address has already been learnt (Step S704). When the target MAC address has not yet been learnt (NO at Step S705), the packet SW mechanism 160 outputs the packet to respective ports P1 to P8 in the apparatus. When output destination ports constitute a trunk, the packet SW mechanism 160 selects one of the ports constituting the trunk and outputs the packet thereto (Step S706). On the other hand, when the target MAC address has already been learnt (YES at Step S705), the packet SW mechanism 160 performs a packet output process (Step S707).

When the input source of the packet is a normal port group (YES at Step S703), the packet SW mechanism 160 learns the sender MAC address and a reception position of the packet, and stores them in the learning table 15. When the packet is received by the trunk, the packet SW mechanism 160 learns the trunk number (Step S708).

The packet SW mechanism 160 refers to the EtherType value and the OpeCode of the packet (see FIG. 39) to determine the packet type (Step S709). When the packet is a normal packet (YES at Step S710), the packet SW mechanism 160 performs the normal-packet output process (Step S711). On the other hand, when the packet is not a normal packet (NO at Step S710), the packet SW mechanism 160 performs the link-trace process (Step S712).

Figure 6:
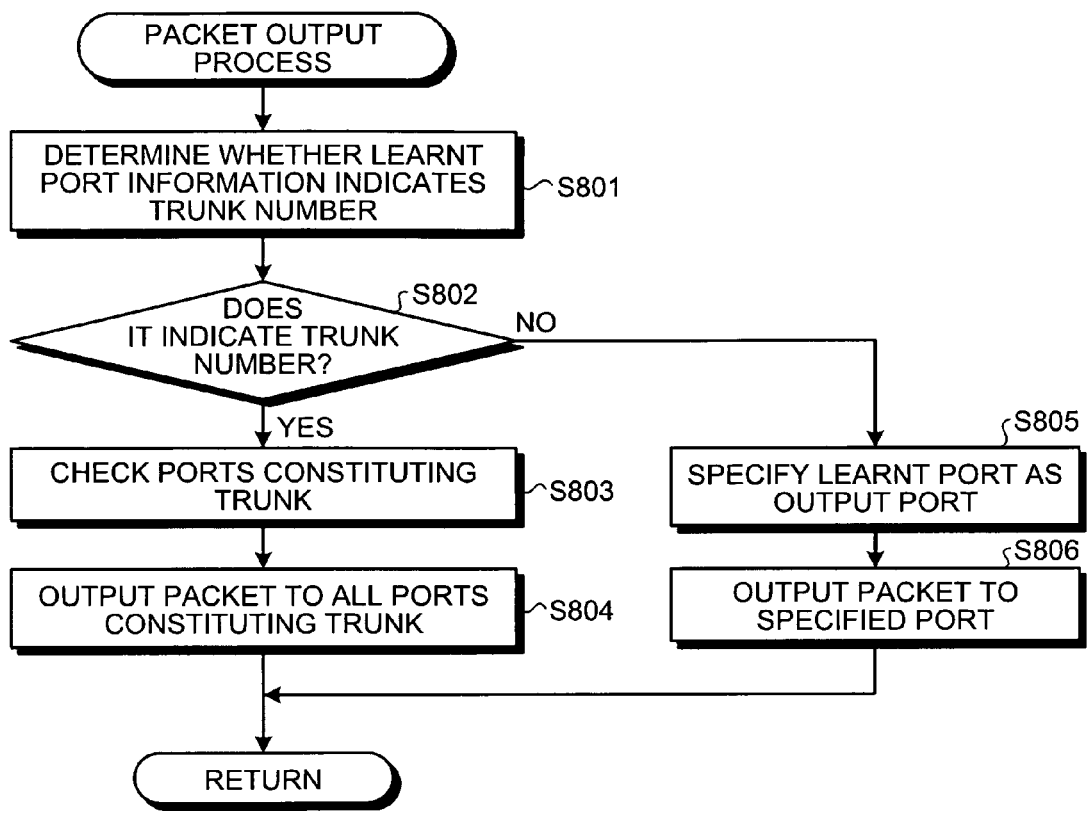
FIG. 6 is a detailed flowchart of a packet output process shown in FIG. 5.

FIG. 6 is a detailed flowchart of the packet output process performed at step S707 in FIG. 5. As shown in FIG. 6, the packet SW mechanism 160 determines whether the learnt port information indicates a trunk number (Step S801). When the learnt port information indicates a trunk number (YES at Step S802), the packet SW mechanism 160 checks ports constituting a trunk (Step S803), and outputs a packet to all the ports constituting the trunk (Step S804).

Meanwhile, when the learnt port information does not indicate a trunk number (NO at Step S802), the packet SW mechanism 160 specifies a learnt port as an output port (Step S805), and outputs a packet to the specified port (Step S806).

Figure 7:
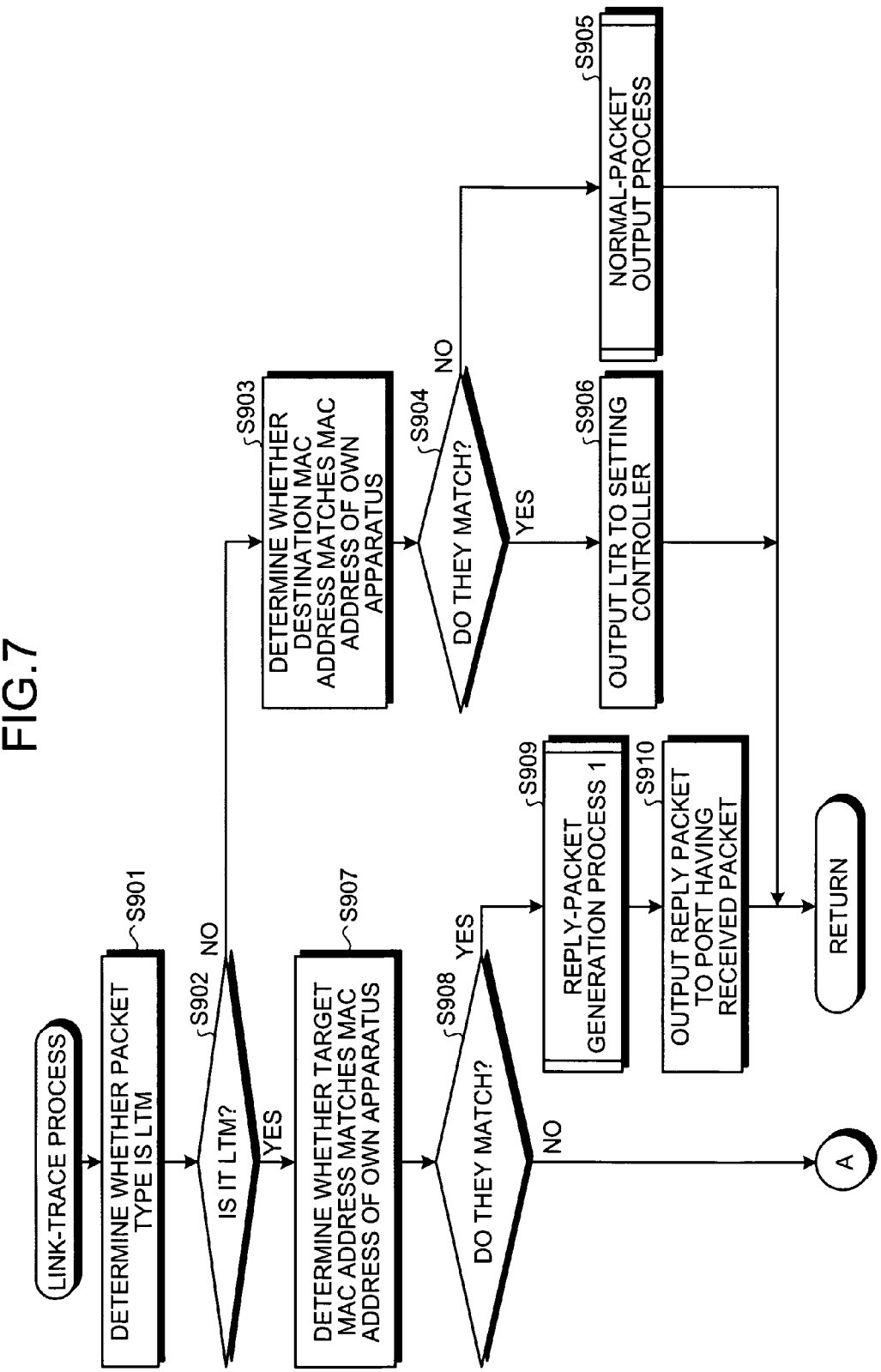
FIGS. 7 and 8 are detailed flowcharts of a link-trace process shown in FIG. 5.
Figure 8:
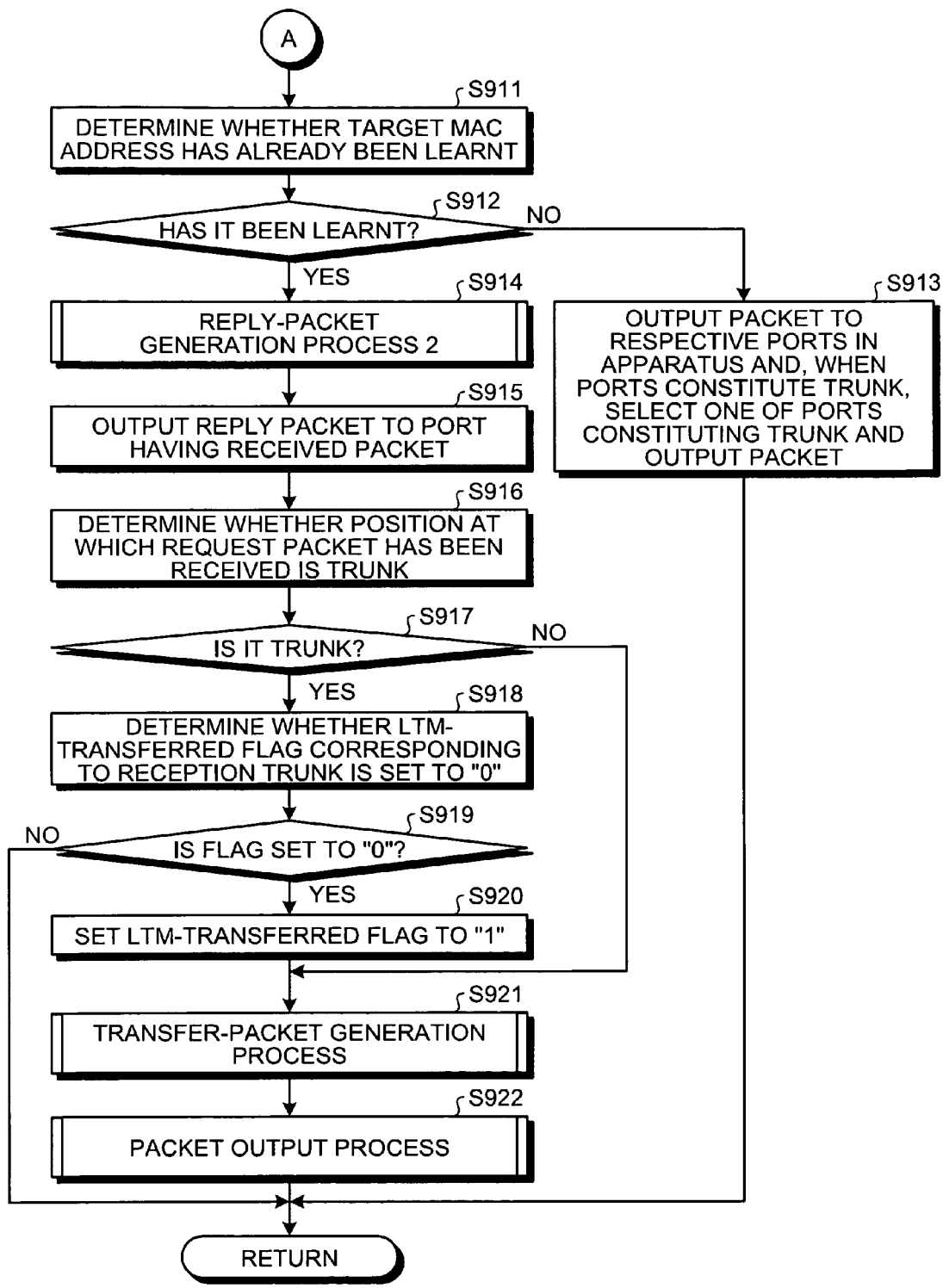

FIGS. 7 and 8 are detailed flowcharts of the link-trace process performed at Step S712 in FIG. 5. As shown in FIG. 7, the packet SW mechanism 160 determines whether the packet type is LTM (Step S901). When the packet type is LTR (NO at Step S902), the packet SW mechanism 160 determines whether the destination MAC address matches the MAC address of the own apparatus (Step S903).

When the addresses do not match (NO at Step S904), the packet SW mechanism 160 performs the normal-packet output process (Step S905). On the other hand, when the addresses match (YES at Step S904), the packet SW mechanism 160 outputs LTR to the setting controller 130 (Step S906).

When the packet type is LTM (YES at Step S902), the packet SW mechanism 160 determines whether the target MAC address matches the MAC address of the own apparatus (Step S907). When the target MAC address matches the MAC address of the own apparatus (YES at Step S908), the packet SW mechanism 160 performs the reply-packet generation process 1 (Step S909), and outputs a reply packet to the port having received the packet (Step S910).

When the target MAC address does not match the MAC address of the own apparatus (NO at Step S908), the packet SW mechanism 160 determines whether the target MAC address has already been learnt (Step S911). When the target MAC address has not yet been learnt (NO at Step S912), the packet SW mechanism 160 outputs the packet to respective ports P1 to P8 in the apparatus (excluding the reception port). When output destination ports constitute a trunk, the packet SW mechanism 160 selects one of the ports constituting the trunk and outputs the packet thereto (Step S913).

On the other hand, when the target MAC address has already been leant (YES at Step S912), the packet SW mechanism 160 performs the reply-packet generation process 2 (Step S914), outputs a reply packet to the port having received the packet (Step S915), and determines whether the position at which the request packet has been received is a trunk (Step S916).

When the position is not a trunk (NO at Step S917), the process control proceeds to step S921, described later. On the other hand, when the position is a trunk (YES at Step S917), the packet SW mechanism 160 determines whether the LTM-transfer flag corresponding to the reception trunk is set to "0" (Step S918).

When the LTM-transfer flag is set to "1" (NO at Step S919), the packet SW mechanism 160 finishes the link-trace process. On the other hand, when the LTM-transfer flag is set to "0" (YES at Step S919), the packet SW mechanism 160 sets the flag to "1" (Step S920), performs the transfer-packet generation process (Step S921), and performs the packet output process (Step S922).

The normal-packet output process at Steps S711 in FIG. 5 and S905 in FIG. 7 is performed in the same manner as previously described in connection with FIG. 43. The reply-packet generation process 1 shown in FIG. 7 and the reply-packet generation process 2 shown in FIG. 8 are performed in the same manner as previously described in connection with FIGS. 46 and 47. Therefore, the same explanation is not repeated.

As described above, according to the first embodiment, upon receipt of LTM, a switch (100 to 500) transfers the LTM, when links to the transfer destination constitute a link aggregation, to all physical links constituting the link aggregation. The switch (100 to 500) receives LTR from the physical links in response to the LTM, and generates link-trace result data (see FIG. 3). Based on the link-trace result data, the administrator can accurately recognize the number of physical links capable of normal packet transfer.

Figure 9:
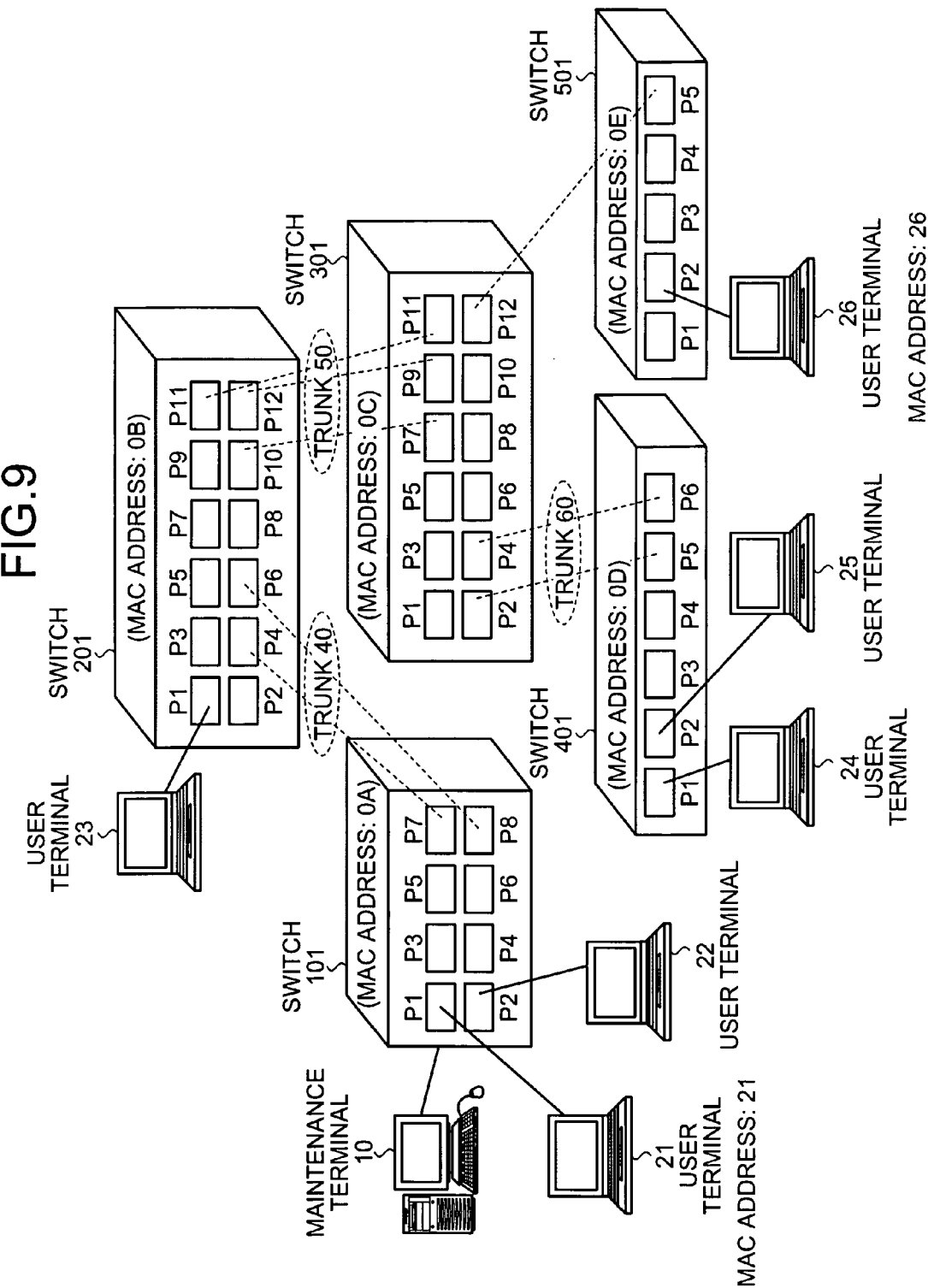
FIG. 9 is a schematic diagram of a network system according to a second embodiment.

FIG. 9 is a schematic diagram of a network system according to a second embodiment. The network system of the second embodiment includes switches 101 to 501 that perform data transfer, user terminals 21 to 26, and the maintenance terminal 10 that performs maintenance and management of the switch 101.

The respective switches 101 to 501 include ports for connecting to the user terminals and other switches, and each port corresponds to one physical link. The port is identified by a number such as PN (N: a natural number).

The switch 101 includes ports P1 to P8. The port P1 is connected to the user terminal 21, the port P2 is connected to the user terminal 22, and the ports P7 and P8 are connected to the ports P4 and P6 of the switch 201. The switch 101 is also connected to the maintenance terminal 10.

The switch 201 includes ports P1 to P12. The port P1 is connected to the user terminal 23, the ports P4 and P6 are connected to the ports P7 and P8 of the switch 101, and the ports P10 to P12 are connected to the ports P7, P9, and P11 of the switch 301.

The switch 301 includes the ports P1 to P12. The ports P2 and P4 are connected to the ports P5 and P6 of the switch 401, the ports P7, P9, and P11 are connected to the ports P10 to P12 of the switch 201, and the port P12 is connected to the port P5 of the switch 501.

The switch 401 includes the ports P1 to P6. The port P1 is connected to the user terminal 24, the port P2 is connected to the user terminal 25, and the ports P5 and P6 are connected to the ports P2 and P4 of the switch 301.

The switch 501 includes the ports P1 to P5. The port P2 is connected to the user terminal 26, and the port P5 is connected to the port P12 of the switch 301.

It is assumed that each of the switches 101 to 501 has a unique MAC address. Specifically, the MAC address of the switch 101 is 0A, the MAC address of the switch 201 is 0B, the MAC address of the switch 301 is 0C, the MAC address of the switch 401 is 0D, and the MAC address of the switch 501 is 0E. All MAC addresses are indicated in the hexadecimal notation. The MAC address has actually 6 bytes; however, zeros in front are omitted.

It is also assumed herein that each of the user terminals 21 to 26 is assigned a unique MAC address as in the switches 101 to 501. Specifically, reference number 21 is assigned to the MAC address of the user terminal 21, and 26 is assigned to the MAC address of the user terminal 26. The MAC addresses of the user terminals 22 to 25 are omitted here.

In FIG. 9, the link aggregation is used somewhere for connecting the switches. To identify a logical link formed by the link aggregation, trunk number is used. Trunk number of the logical link for connecting the switch 101 with the switch 201 is defined as the trunk 40, trunk number of the logical link for connecting the switch 201 with the switch 301 is defined as the trunk 50, and trunk number of the logical link for connecting the switch 301 with the switch 401 is defined as the trunk 60.

Each of the switches 101 to 501 outputs a link-trace message packet to all physical links constituting a trunk, as with the switches 100 to 500, and receives a link-trace reply packet from each physical link, in the situation where path search is made.

For example, when the switch 101 outputs LTM to the respective physical links of the trunk 40, the switch 201 generates LTR including the trunk number 40 and each port number P4 and P6. That is, LTR output from P4 of the switch 201 includes the trunk number 40 and the port number 4, and LTR output from P6 of the switch 201 includes the trunk number 40 and the port number P6.

As described above, according to the second embodiment, LTR includes the trunk number and the port number. Thus, a switch that performs link-trace analysis can distinguish between a normal physical link and a failed physical link among physical links constituting a trunk.

Figure 10:
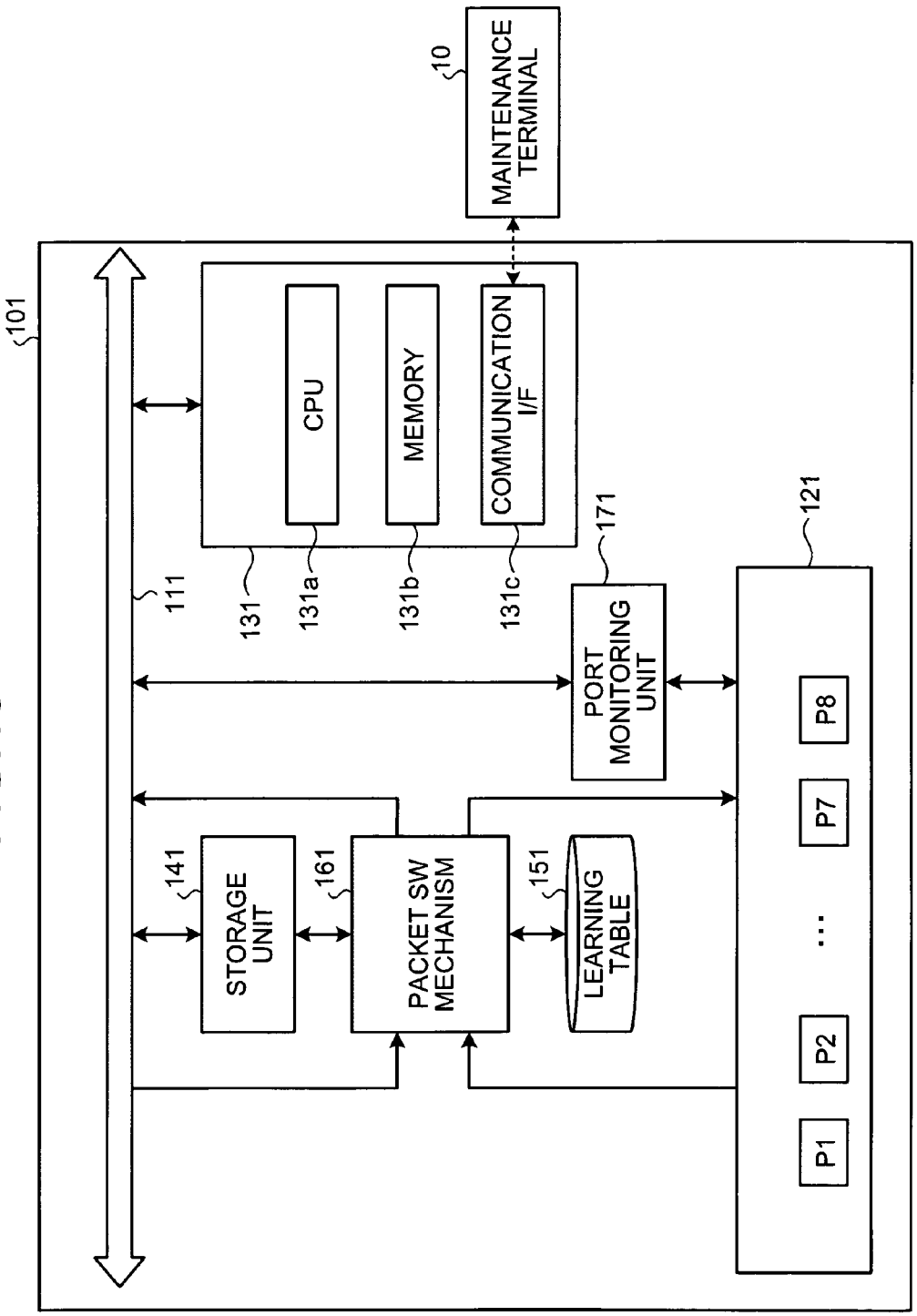
FIG. 10 is a functional block diagram of a switch shown in FIG. 9.

Explained below is the configuration of the switch 101. Although the switches 201 to 501 have different number of ports than the switch 101, the switches 201 to 501 can be of the same configuration as the switch 101, and thus only the switch 101 is described in detail. FIG. 10 is a functional block diagram of the switch 101. The switch 101 includes a bus 111, a communication port group 121, a setting controller 131, a storage unit 141, a learning table 151, a packet SW mechanism 161, and a port monitoring unit 171.

The bus 111 connects the setting controller 131, the storage unit 141, the packet SW mechanism 161, and the port monitoring unit 171 with each other. The communication port group 121 includes the ports P1 to P8, and transfers the packet to other switches or the user terminals via the ports P1 to P8.

The setting controller 131 controls the entire switch 101, and includes a CPU 131a, a memory 131b, and a communication I/F 131c. The CPU 131a performs various processes by executing computer programs, and generates the link-trace result data.

Upon receipt of LTR from the packet SW mechanism 161, the CPU 131a stores the MAC address of the LTR (sender MAC address), the trunk number, and the port number in the memory 131b in association with each other, and generates link-trace result data referring to the memory 131b.

FIG. 11 is one example of data structure of a reception LTR table according to the second embodiment. As shown in FIG. 11, the reception LTR table stores therein TTL, sender MAC address, trunk number, and port number. The number of the same trunk number indicates the number of connection links. For example, if there are two sets of data of the trunk number 40 in the reception LTR table, the number of connection links corresponding to the trunk number 40 becomes 2.

FIG. 12 is one example of the link-trace result data according to the second embodiment. As shown in FIG. 12, in the link-trace result data, respective MAC addresses are arranged in decreasing order of size of TTL (arranged in order of paths), and the number of connection links, the trunk number, and the port number are registered in association with the respective MAC addresses.

That is, as can be seen from FIG. 12, the physical links connected to the ports P4 and P6 of the switch 201 are operating normally in the trunk 40 connecting the switch 101 and the switch 201, and the physical links connected to the ports P7, P9, and P11 of the switch 301 are operating normally in the trunk 50 connecting the switch 201 and the switch 301. If the trunk number connecting respective switches 101 to 501 and the port numbers constituting the trunks are managed beforehand, the trunk having a failed physical link can be easily detected by comparing the link-trace result data generated by the CPU 131a with the trunk number and port number managed beforehand.

Referring back to FIG. 10, the memory 131b stores therein the computer programs executed by the CPU 131a and data necessary for the computer programs. Particularly, in the memory 131b are stored the reception LTR table as shown in FIG. 11, the link-trace result data as shown in FIG. 12, and the like.

The communication I/F 131c receives a command from the maintenance terminal 10 used by the administrator, notifies the CPU 131a of the command, and sends back an execution result with respect to the command (for example, the link-trace result data) to the maintenance terminal 10.

The storage unit 141 stores therein the port management table and the link-aggregation management table. The port management table manages information of the link aggregation ports and the like. The data structure of the port management table according to the second embodiment is the same as that shown in FIG. 34. The data structure of the link-aggregation management table according to the second embodiment is the same as that shown in FIG. 4. Therefore, the same explanation is not repeated.

The learning table 151 stores therein the sender address of the packet received in the past, and identification information of the port or the trunk having received the packet in association with each other. The data structure of the learning table 151 is the same as that of the learning table 15 shown in FIG. 36, and the same explanation is not repeated.

Upon receipt of the packet from the communication port group 121 or the bus 111, the packet SW mechanism 161 determines a transfer destination of the packet according to the packet type and the reference result of the learning table 151 and transfers the packet to the communication port group 121 or the bus 111.

Upon transferring LTM to a destination, the packet SW mechanism 161 outputs the LTM, when destination ports constitute a trunk, to all the destination ports constituting the trunk. Further, when the packet SW mechanism 161 receives LTM from a port constituting a trunk and sends LTR to the sender in response to the LTM, the packet SW mechanism 161 refers to the respective tables stored in the storage unit 141 to register the trunk number and the port number corresponding to the port as the trunk number and the port number for the LTR.

The port monitoring unit 171 monitors the communication port group 121, and detects a fault or recovery of the communication ports P1 to P8 and the physical link connected to the communication ports P1 to P8. When the fault or recovery of the physical link is detected, the port monitoring unit 171 outputs a detection result to the setting controller 131.

When a fault occurs in the link aggregation port, the port monitoring unit 171 outputs information of the failed port to the setting controller 131, and updates the port management table, upon receipt of an instruction from the setting controller 131. For example, the port monitoring unit 171 rewrites the flooding target flag of a normal port in the same trunk as the failed port to "1".

When a fault occurs in the link aggregation port, the port monitoring unit 171 outputs the information of the failed port to the setting controller 131, and updates the link-aggregation management table, upon receipt of an instruction from the setting controller 131. That is, the port monitoring unit 171 reduces the number of normal ports in the trunk to remove the failed port from the respective port numbers constituting the trunk, and resets to left-align the port numbers. When the failed port is recovered, the port monitoring unit 171 increases the number of normal ports in the trunk, adds the recovered port to the port information constituting the trunk, and resets to left-align the port numbers.

Figure 13:
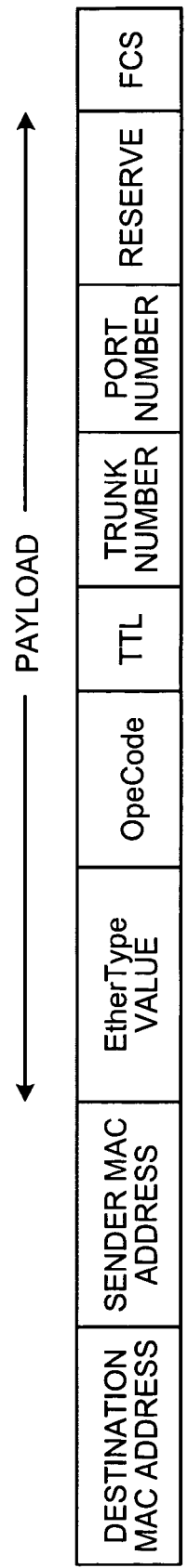
FIG. 13 is one example of data structure of LTR according to the second embodiment.

FIG. 13 is one example of data structure of LTR according to the second embodiment. As shown in FIG. 13, LTR includes destination MAC address, sender MAC address, EtherType value, OpeCode, TTL, trunk number, port number, and FCS.

When LTR is sent back in response to LTM from a trunk, a trunk number obtained from the LTM is registered as the trunk number. Further, when LTR is sent back in response to LTM from a trunk, a port number obtained from the LTM is registered as the port number.

The data structure of LTM and that of the normal packet of the second embodiment are the same as those shown in FIGS. 37 to 41, and the same explanation is not repeated.

The operation of the packet SW mechanism 161 is explained next. The packet SW mechanism 161 operates basically in the same manner as previously described in connection with FIGS. 5 to 8 except the reply-packet generation process 2 at Step S914 in FIG. 8. Therefore, only the reply-packet generation process 2 according to the second embodiment is explained below.

Figure 14:
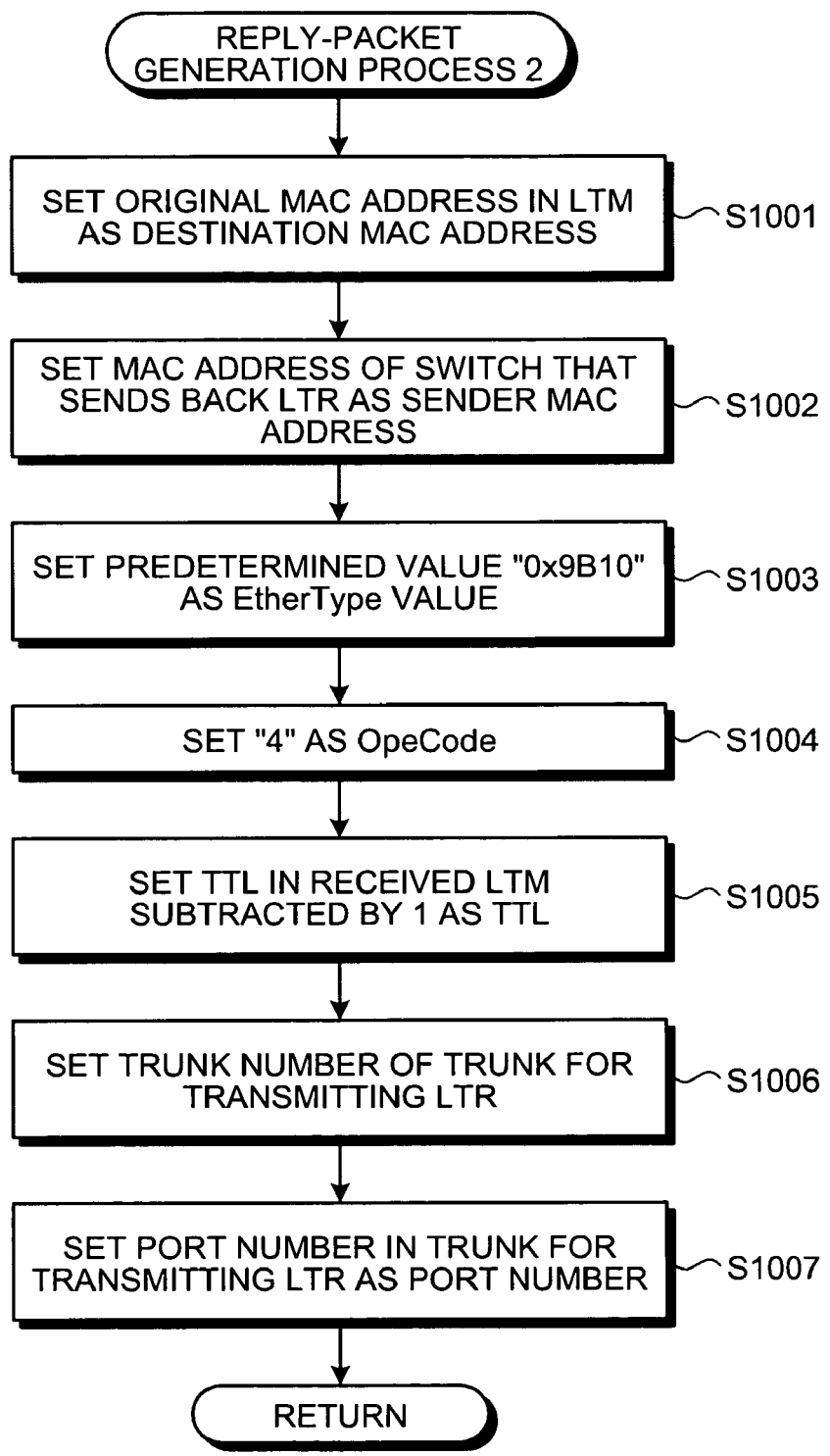
FIG. 14 is a detailed flowchart of a reply-packet generation process 2 according to the second embodiment.

FIG. 14 is a detailed flowchart of the reply-packet generation process 2 according to the second embodiment. As shown in FIG. 14, the packet SW mechanism 161 sets the original MAC address of LTM as the destination MAC address (Step S1001), and sets the MAC address of a switch that sends back LTR as the sender MAC address (Step S1002).

The packet SW mechanism 161 sets a predetermined value "0x9B10" as the EtherType value (Step S1003), sets "4" as the OpeCode (Step S1004), and sets TTL of received LTM subtracted by 1 as the TTL value (Step S1005).

The packet SW mechanism 161 sets a trunk number for LTR transfer to a trunk (Step S1006), and sets a port number in the trunk for LTR transfer (Step S1007).

In the network system of the second embodiment, upon receipt of LTM, a switch (101 to 501) transfers the LTM, when links to the transfer destination constitute a link aggregation, to all physical links constituting the link aggregation. The LTM transferred to the respective physical links includes the trunk number and the port number. Accordingly, the switch as an LTM sender can generate link-trace result data including trunk numbers used by respective switches (101 to 501), the number of normal links, and the port number of a normal port.

The setting controller 131 generates the link-trace result data as shown in FIG. 12. However, the format of the link-trace result data is not limited thereto, and the normal port and a nonresponsive port from which the response to LTM is not returned can be distinctly displayed.

FIG. 15 is another example of link-trace result data. As shown in FIG. 15, in the link-trace result data, respective MAC addresses are arranged in decreasing order of size of TTL (arranged in order of paths), and trunk number, the number of constituting links, normal port number, and non-responsive port number are registered in association with the respective MAC addresses.

When the link-trace result data as shown in FIG. 15 is generated, a trunk configuration database is stored in the memory 131b. FIG. 16 is one example of data structure of the trunk configuration database. As shown in FIG. 16, the trunk configuration database includes switch MAC address indicating the MAC address of the respective switches, trunk number, the number of ports constituting a trunk, i.e., the number of ports included in the trunk, and first to n-th port numbers.

The CPU 131a can generate the link-trace result data by comparing the reception LTR table (see FIG. 11) stored in the memory 131b with the trunk configuration database. Among the ports included in the trunk in the trunk configuration database, the port not included in the reception LTP table as shown in FIG. 11 is the nonresponsive port.

As shown in FIG. 15, by arranging and displaying the switch present in a communication path from the sender switch (the switch 101) to the destination switch (the switch 501), trunk number used by the switch, the number of links constituting the trunk, port number constituting the trunk, normal port number according to the reception result of LTR, and port number from which a response is not returned, the administrator can easily recognize which port is normal and which port is abnormal.

Figure 17:
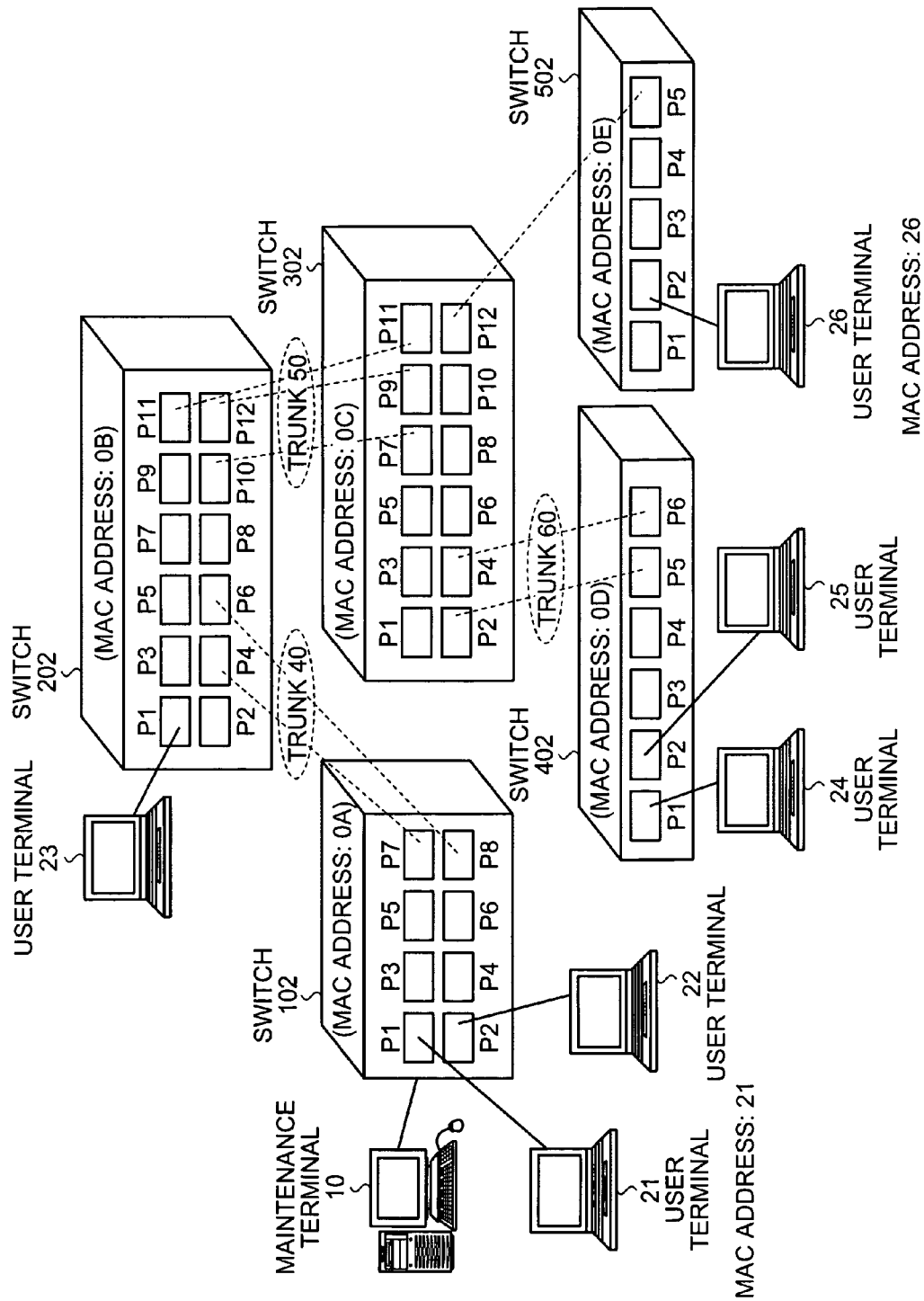
FIG. 17 is a schematic diagram of a network system according to a third embodiment.

FIG. 17 is a schematic diagram of a network system according to a third embodiment. The network system of the third embodiment includes switches 102 to 502 that perform data transfer, user terminals 21 to 26, and the maintenance terminal 10 that performs maintenance and management of the switch 102.

The respective switches 102 to 502 include ports for connecting to the user terminals and other switches, and each port corresponds to one physical link. The port is identified by a number such as PN (N: a natural number).

The switch 102 includes ports P1 to P8. The port P1 is connected to the user terminal 21, the port P2 is connected to the user terminal 22, and the ports P7 and P8 are connected to the ports P4 and P6 of the switch 202. The switch 102 is also connected to the maintenance terminal 10.

The switch 202 includes ports P1 to P12. The port P1 is connected to the user terminal 23, the ports P4 and P6 are connected to the ports P7 and P8 of the switch 102, and the ports P10 to P12 are connected to the ports P7, P9, and P11 of the switch 302.

The switch 302 includes the ports P1 to P12. The ports P2 and P4 are connected to the ports P5 and P6 of the switch 402, the ports P7, P9, and P11 are connected to the ports P10 to P12 of the switch 202, and the port P12 is connected to the port P5 of the switch 502.

The switch 402 includes the ports P1 to P6. The port P1 is connected to the user terminal 24, the port P2 is connected to the user terminal 25, and the ports P5 and P6 are connected to the ports P2 and P4 of the switch 302.

The switch 502 includes the ports P1 to P5. The port P2 is connected to the user terminal 26, and the port P5 is connected to the port P12 of the switch 302.

It is assumed that each of the switches 102 to 502 is assigned a unique MAC address. Each of the user terminals 21 to 26 is assigned a unique MAC address as in the switches 102 to 502.

In the first and second embodiments, one MAC address is used for each switch as the MAC address of LTM and LTR. On the other hand, in the third embodiment, an address of each port in the switch is used as the MAC address of LTM and LTR.

Thus, by using the MAC address of each port, the port position of the switch present in the communication path can be specified by the MAC address without changing the data structure of LTR (see FIG. 41).

Figure 18:
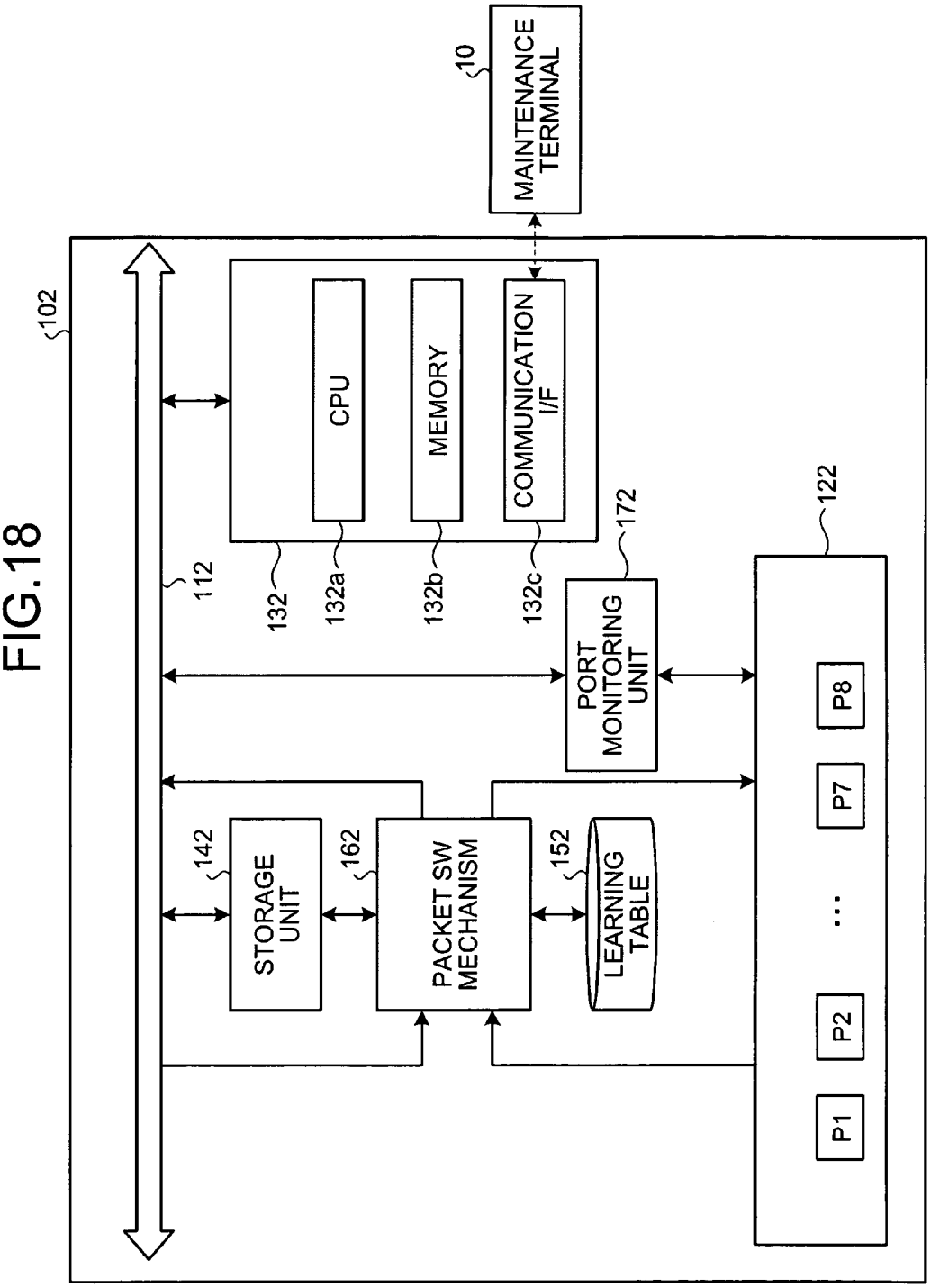
FIG. 18 is a functional block diagram of a switch shown in FIG. 17.

Explained below is the configuration of the switch 102. Although the switches 202 to 502 have different number of ports than the switch 102, the switches 202 to 502 can be of the same configuration as the switch 102, and thus only the switch 102 is described in detail. FIG. 18 is a functional block diagram of the switch 102. The switch 102 includes a bus 112, a communication port group 122, a setting controller 132, a storage unit 142, a learning table 152, a packet SW mechanism 162, and a port monitoring unit 172.

The bus 112 connects the setting controller 132, the storage unit 142, the packet SW mechanism 162, and the port monitoring unit 172 with each other. The communication port group 122 includes the ports P1 to P8, and transfers the packet to other switches or the user terminals via the ports P1 to P8.

The setting controller 132 controls the entire switch 102, and includes a CPU 132a, a memory 132b, and a communication I/F 132c. The CPU 132a performs various processes by executing computer programs, and generates the link-trace result data.

Upon receipt of LTR from the packet SW mechanism 162, the CPU 132a compares the port MAC address of the LTR with a port-MAC-address management table stored in the memory 132b, and generates link-trace result data.

FIG. 19 is one example of data structure of the port-MAC-address management table. As shown in FIG. 19, in the port-MAC-address management table, port MAC address, trunk number, port number, and switch MAC address are stored in association with each other. For example, when the CPU 132a obtains LTR including the port MAC address "00-00-00-01-0B", the LTR is the one returned from a port with port number "4" in trunk number "40" of the switch 202 with the switch MAC address "00-00-00-00-0B".

FIG. 20 is one example of link-trace result data according to the third embodiment. As shown in FIG. 20, in the link-trace result data, respective port MAC addresses are arranged in decreasing order of size of TTL, and the switch MAC address and the trunk number are registered in association with the respective port MAC addresses.

Referring back to FIG. 18, the memory 132b stores therein the computer programs executed by the CPU 130a and data necessary for the computer programs. Particularly, in the memory 132b are stored the port-MAC-address management table as shown in FIG. 19, the link-trace result data as shown in FIG. 20, and the like.

The communication I/F 132c receives a command from the maintenance terminal 10 used by the administrator, notifies the CPU 132a of the command, and sends back an execution result with respect to the command (for example, the link-trace result data) to the maintenance terminal 10.

The storage unit 142 stores therein the port management table and the link-aggregation management table. The port management table manages information of the link aggregation ports and the like. The data structure of the port management table according to the third embodiment is the same as that shown in FIG. 34. The data structure of the link-aggregation management table is the same as that shown in FIG. 4. Therefore, the same explanation is not repeated.

The learning table 152 stores therein the sender address of the packet received in the past, and identification information of the port or the trunk having received the packet in association with each other. The data structure of the learning table 152 is the same as that of the learning table 15 shown in FIG. 36, and the same explanation is not repeated.

Upon receipt of the packet from the communication port group 122 or the bus 112, the packet SW mechanism 162 determines a transfer destination of the packet according to the packet type and the reference result of the learning table 152 and transfers the packet to the communication port group 122 or the bus 112. When LTM and LTR are transferred, the packet SW mechanism 162 uses the MAC address for each port in the switch (or the MAC address of the trunk) as the MAC address of LTM and LTR.

The port monitoring unit 172 monitors the communication port group 122, and detects a fault or recovery of the communication ports P1 to P8 and the physical link connected to the communication ports P1 to P8. When the fault or recovery of the physical link is detected, the port monitoring unit 172 outputs a detection result to the setting controller 132.

When a fault occurs in the link aggregation port, the port monitoring unit 172 outputs information of the failed port to the setting controller 132, and updates the port management table, upon receipt of an instruction from the setting controller 132. For example, the port monitoring unit 172 rewrites the flooding target flag of a normal port in the same trunk as the failed port to "1".

When a fault occurs in the link aggregation port, the port monitoring unit 172 outputs the information of the failed port to the setting controller 132, and updates the link-aggregation management table, upon receipt of an instruction from the setting controller 132. That is, the port monitoring unit 172 reduces the number of normal ports in the trunk to remove the failed port from the respective port numbers constituting the trunk, and resets to left-align the port numbers. When the failed port is recovered, the port monitoring unit 172 increases the number of normal ports in the trunk, adds the recovered port to the port information constituting the trunk, and resets to left-align the port numbers.

The packet SW mechanism 162 operates basically in the same manner as previously described in connection with FIG.

5 except the link-trace process at Step S712 in FIG. 5. Therefore, the link-trace process according to the third embodiment is explained below.

Figure 21:
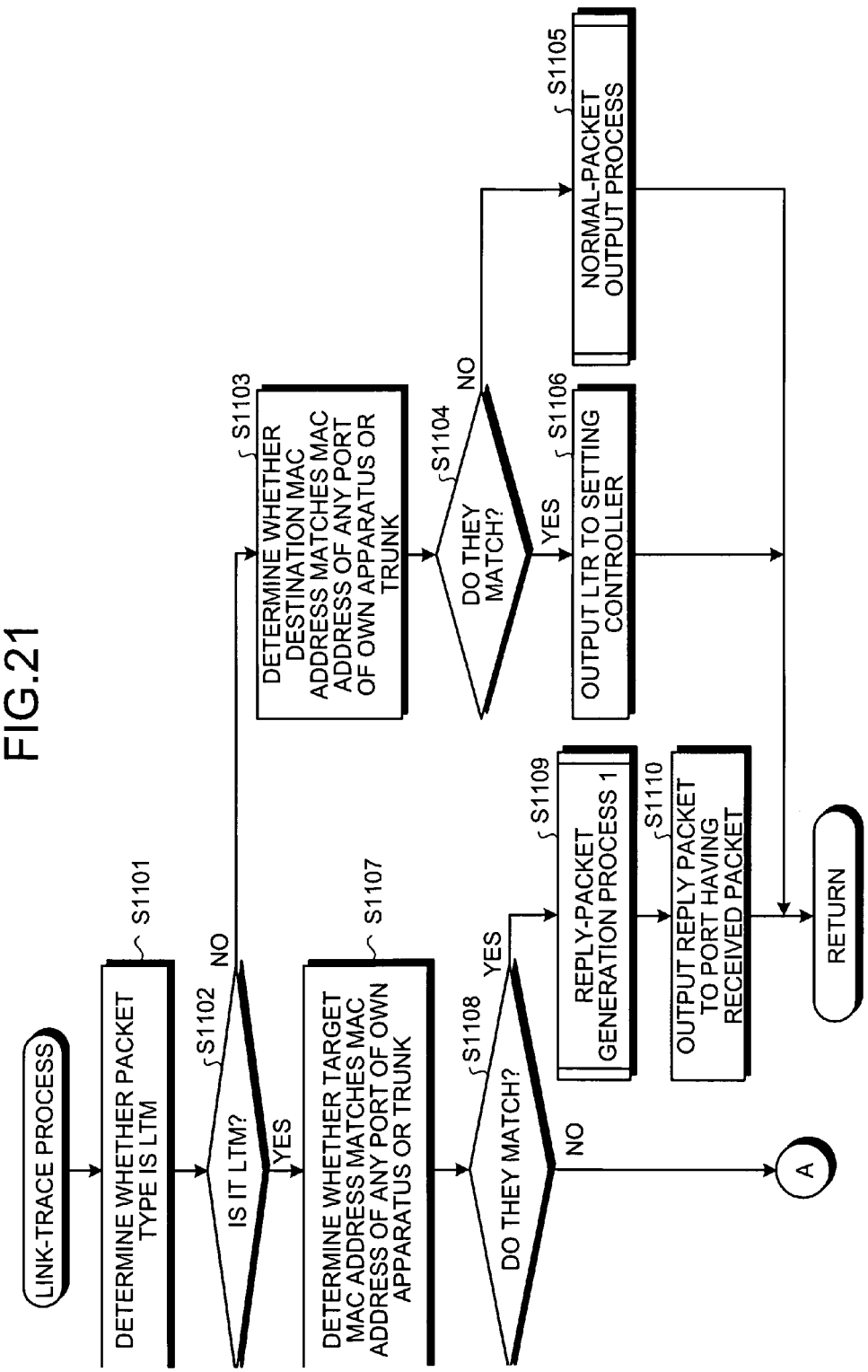
FIGS. 21 and 22 are detailed flowcharts of a link-trace process according to the third embodiment.
Figure 22:
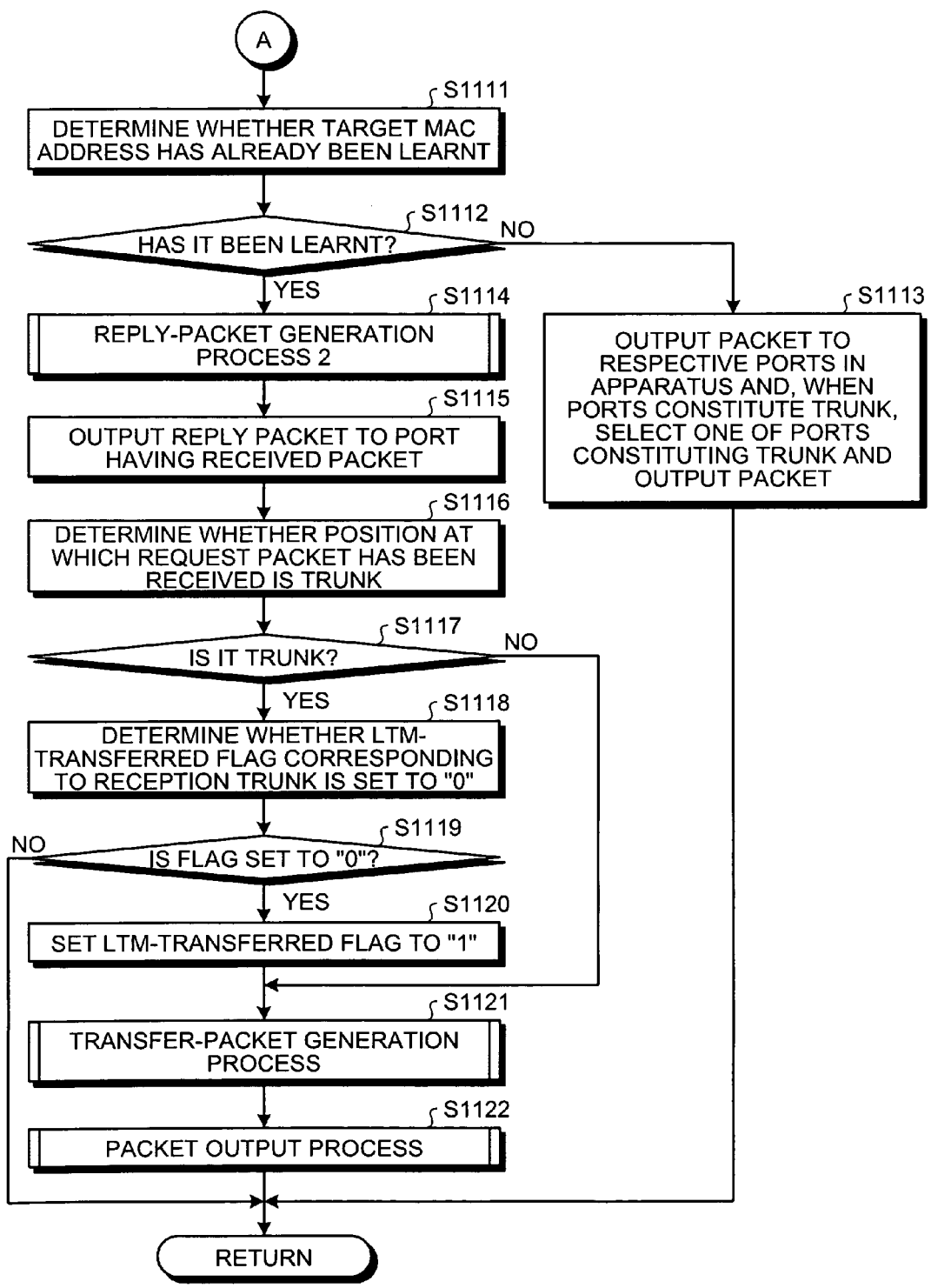

FIGS. 21 and 22 are detailed flowcharts of the link-trace process according to the third embodiment. As shown in FIG. 21, the packet SW mechanism 162 determines whether the packet type is LTM (Step S1101). When the packet type is LTR (NO at Step S1102), the packet SW mechanism 162 determines whether the destination MAC address matches the MAC address of any port of the own apparatus or the trunk (Step S1103).

When the addresses do not match (NO at Step S1104), the packet SW mechanism 162 performs the normal-packet output process (Step S1105). On the other hand, when the addresses match (YES at Step S1104), the packet SW mechanism 162 outputs LTR to the setting controller 132 (Step S1106).

When the packet type is LTM (YES at Step S1102), the packet SW mechanism 162 determines whether the target MAC address matches the MAC address of any port of the own apparatus or the trunk (Step S1107). When the target MAC address matches the MAC address of any port of the own apparatus or the trunk (YES at Step S1108), the packet SW mechanism 162 performs the reply-packet generation process 1 (Step S1109), and outputs a reply packet to the port having received the packet (Step S1110).

On the other hand, when the target MAC address does not match the MAC address of any port of the own apparatus or the trunk (NO at Step S1108), the packet SW mechanism 162 determines whether the target MAC address has already been learnt (Step S1111). When the target MAC address has not yet been learnt (NO at Step S1112), the packet SW mechanism 162 outputs the packet to respective ports P1 to P8 in the apparatus (excluding the reception port). When output destination ports constitute a trunk, the packet SW mechanism 162 selects one of the ports constituting the trunk and outputs the packet thereto (Step S1113).

On the other hand, when the target MAC address has been leant (YES at Step S1112), the packet SW mechanism 162 performs the reply-packet generation process 2 (Step S1114), outputs the reply packet to the port having received the packet (Step S1115), and determines whether the position at which the request packet has been received is a trunk (Step S1116).

When the position is not a trunk (NO at Step S1117), the process control proceeds to Step S1121, described later. On the other hand, when the position is a trunk (YES at Step S1117), the packet SW mechanism 162 determines whether the LTM-transfer flag corresponding to the reception trunk is set to "0" (Step S1118).

When the flag is set to "1" (NO at Step S1119), the packet SW mechanism 162 finishes the link-trace process. On the other hand, when the flag is set to "0" (YES at Step S1119), the packet SW mechanism 162 sets the LTM-transfer flag to "1" (Step S1120), performs the transfer-packet generation process (Step S1121), and performs the packet output process (Step S1122).

The reply-packet generation process 1 at Step S1109 and the normal-packet output process at Step S1105 in FIG. 21 are performed in the same manner as previously explained in connection with FIGS. 46 and 43, and the same explanation is not repeated. The packet output process at Step S1122 in FIG. 22 is performed in the same manner as previously described in connection with FIG. 6, and the same explanation is not repeated.

Figure 23:
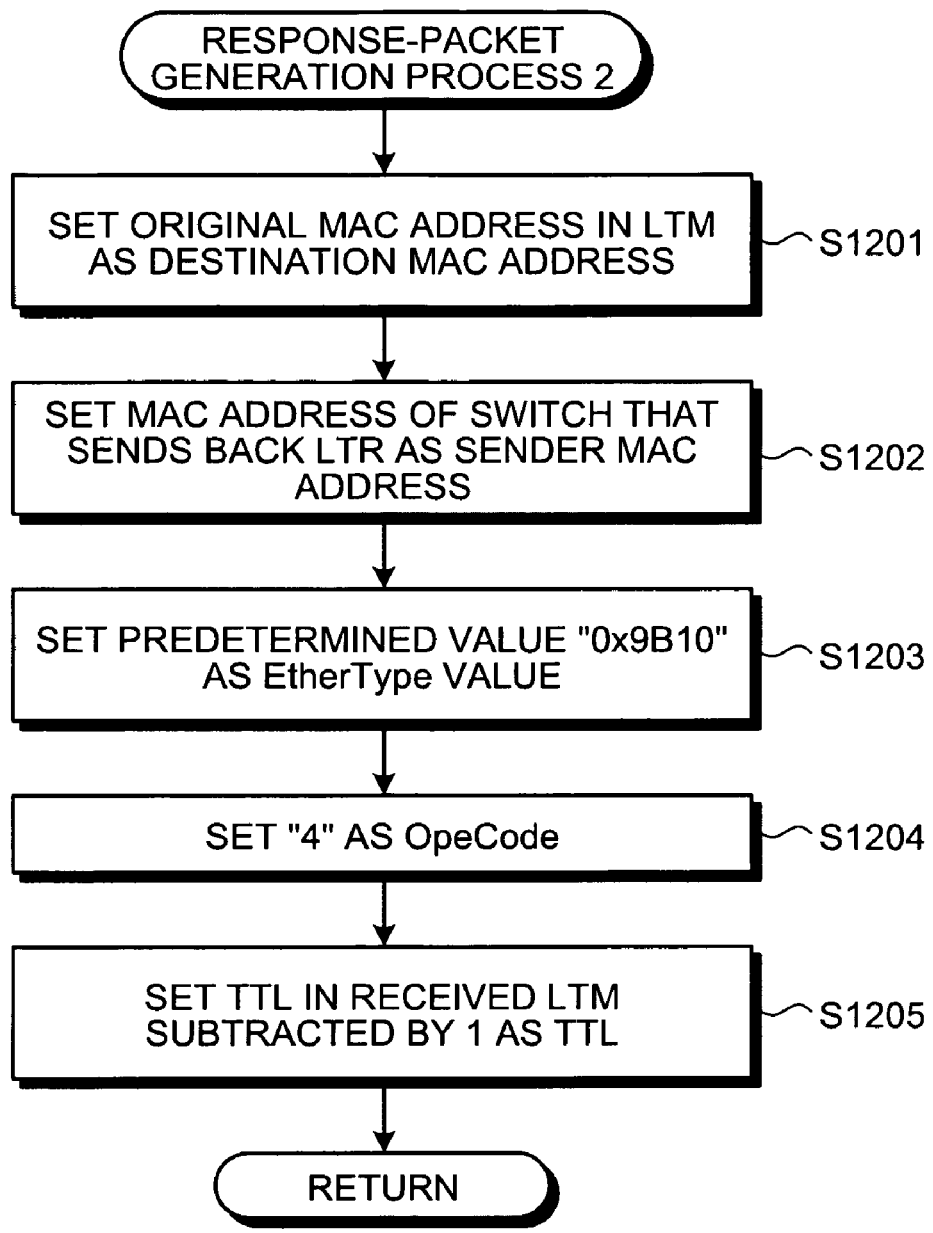
FIG. 23 is a detailed flowchart of a reply-packet generation process 2 shown in FIG. 22.

FIG. 23 is a detailed flowchart of the reply-packet generation process 2 performed at Step S1114 in FIG. 22. As shown in FIG. 23, the packet SW mechanism 162 sets the original MAC address of LTM as the destination MAC address (Step S1201), and sets the MAC address of a switch that sends back LTR as the sender MAC address (Step S1202).

The packet SW mechanism 162 sets a predetermined value "0x9B10" as the EtherType value (Step S1203), sets "4" as the OpeCode (Step S1204), and sets TTL of received LTM subtracted by 1 as the TTL value (Step S1205).

Figure 24:
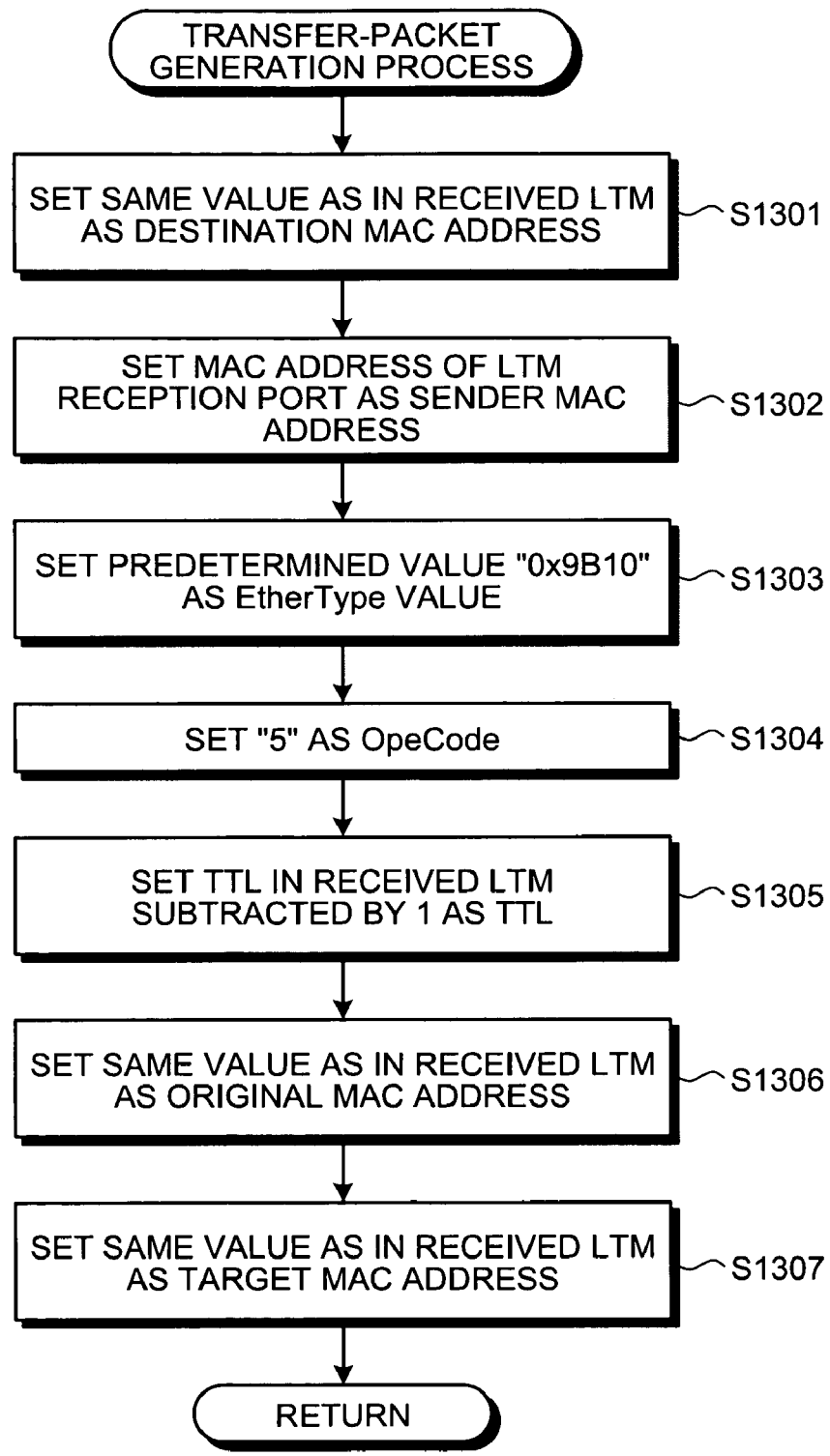
FIG. 24 is a detailed flowchart of a transfer-packet generation process shown in FIG. 22.

FIG. 24 is a detailed flowchart of the transfer-packet generation process performed at Step S1121 in FIG. 22. As shown in FIG. 24, the packet SW mechanism 162 sets the same value as in received LTM as the destination MAC address (Step S1301), and sets the MAC address of a port through which LTM has been received as the sender MAC address (Step S1302).

The packet SW mechanism 162 then sets a predetermined value "0x9B10" as the EtherType value (Step S1303), sets "5" as the OpeCode (Step S1204), and sets TTL of received LTM subtracted by 1 as the TTL value (Step S1305).

The packet SW mechanism 162 sets the same value as in received LTM as the original MAC address (Step S1306), and sets the same value as in received LTM as the target MAC address (Step S1307).

In the network system of the third embodiment, when each of the switches 102 to 502 performs the link-trace process, the address of each port in the switch is used as the MAC address of LTM and LTR. Therefore, position of the port in the communication path can be specified by the MAC address (MAC address of the port) without changing the data structure of LTR (see FIG. 41).

Figure 25:
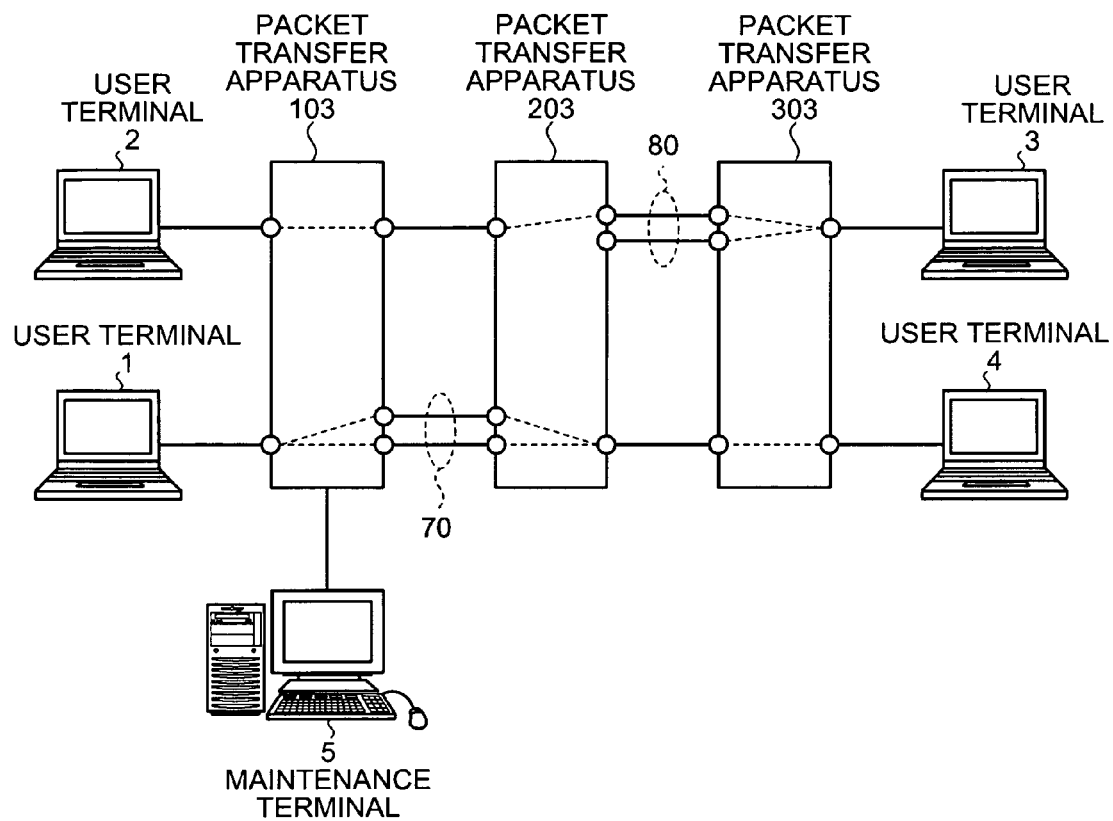
FIG. 25 is a schematic diagram of a network system according to a fourth embodiment.

FIG. 25 is a schematic diagram of a network system according to a fourth embodiment. The network system of the fourth embodiment includes packet transfer apparatuses 103 to 303 that perform data transfer, user terminals 1 to 4, and a maintenance terminal 5 that performs maintenance and management of the packet transfer apparatus 103.

Differently from the layer 2 switch in the first to third embodiments, the packet transfer apparatuses 103 to 303 have no learning function. The packet transfer apparatuses 103 to 303 have a point-to-point packet transfer function in which a transfer destination port is determined according to the position of the reception port.

The packet transfer apparatus 103 is connected to the packet transfer apparatus 203 by a trunk 70, in addition to the normal physical link. The packet transfer apparatus 203 is connected to the packet transfer apparatus 303 by a trunk 80, in addition to the normal physical link.

Each of the packet transfer apparatuses 103 to 303 outputs LTM to all physical links constituting a trunk and receives LTR from the physical links in a situation where path search is made, and detects the number of normal physical links among the physical links constituting the trunk based on each LTR.

As described above, in the network system according to the fourth embodiment, LTM is output to all ports constituting a trunk, and respective physical links output LTR in response to the LTM. Therefore, the administrator can easily recognize the state of respective physical links constituting a trunk, and effectively manage respective trunks.

Figure 26:
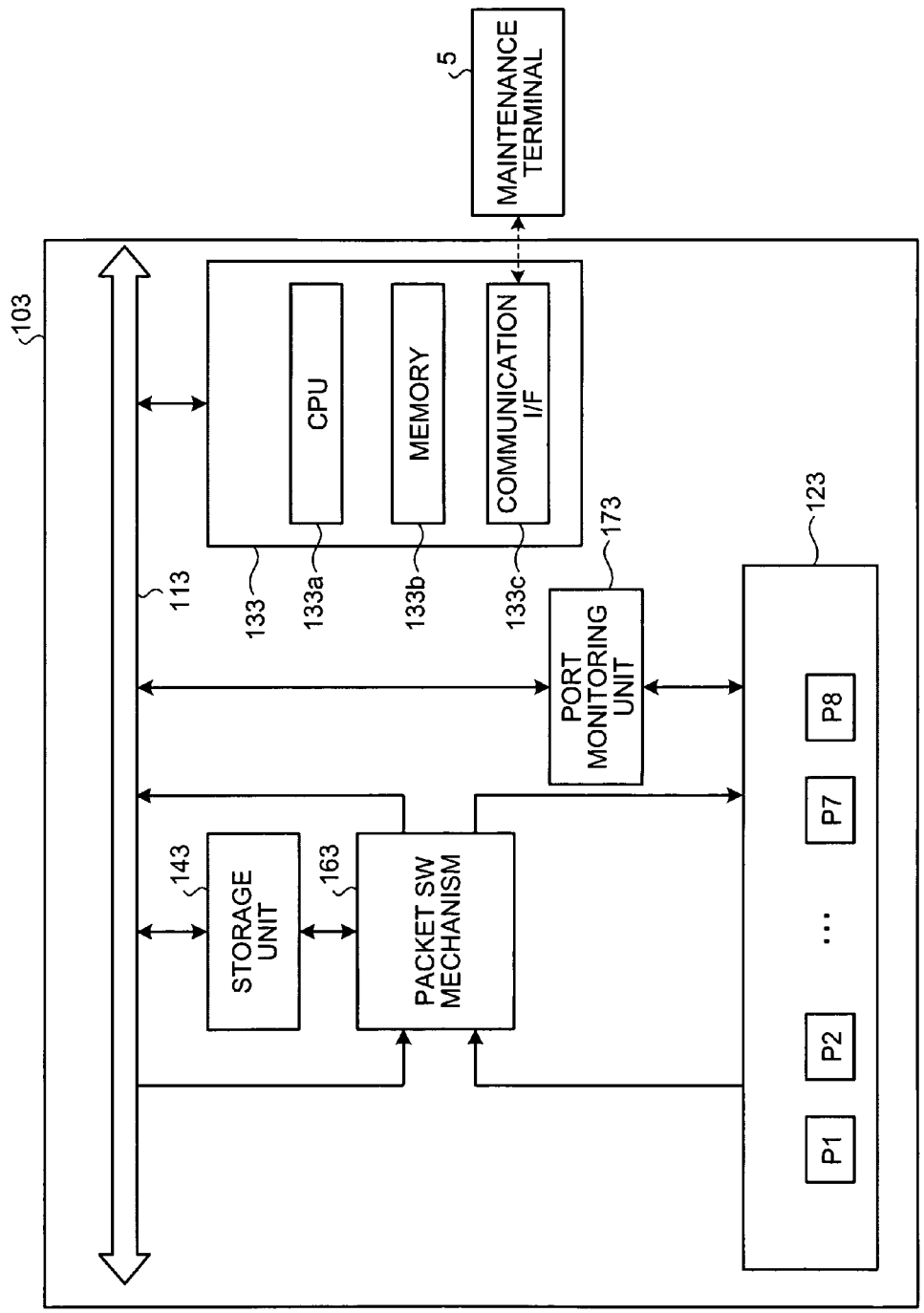
FIG. 26 is a functional block diagram of a packet transfer apparatus shown in FIG. 25.

Explained below is the configuration of the packet transfer apparatus 103. The packet transfer apparatuses 203 and 303 are of the same configuration as the packet transfer apparatus 103, and thus only the packet transfer apparatus 103 is described in detail below. FIG. 26 is a functional block diagram of the packet transfer apparatus 103. The packet transfer apparatus 103 includes a bus 113, a communication port group 123, a setting controller 133, a storage unit 143, a packet SW mechanism 163, and a port monitoring unit 173.

The bus 113 connects the setting controller 133, the storage unit 143, the packet SW mechanism 163, and the port monitoring unit 173 with each other. The communication port group 123 includes ports P1 to P8, and transfers the packet to other packet transfer apparatuses or the user terminals via the ports P1 to P8.

The setting controller 133 controls the packet transfer apparatus 103, and includes a CPU 133a, a memory 133b, and a communication I/F 133c. The CPU 133a performs various processes by executing computer programs, and generates the link-trace result data.

Upon receipt of LTR from the packet SW mechanism 163, the CPU 133a stores the MAC address of the LTR (sender MAC address) in the memory 133b in association with the number of times LTRs with the same MAC address (sender MAC address) have been received, and generates link-trace result data referring to the memory 133b. For example, the link-trace result data is the same as that shown in FIG. 3.

The memory 133b stores therein the computer programs executed by the CPU 133a and data necessary for the computer programs. Particularly, in the memory 133b, the link-trace result data shown in FIG. 3 and the like are stored. The communication I/F 133c receives a command from the maintenance terminal 5 used by the administrator, notifies the CPU 133a of the command, and sends back an execution result with respect to the command (for example, the link-trace result data) to the maintenance terminal 5.

The storage unit 143 stores therein the port management table and the link-aggregation management table. The port management table manages information of the link aggregation ports and the like. The link-aggregation management table manages the trunk constituting the link aggregation. The data structure of the port management table according to the fourth embodiment is the same as that shown in FIG. 34. The link-aggregation management table according to the fourth embodiment is the same as that shown in FIG. 4. Therefore, the same explanation is not repeated.

Upon receipt of the packet from the communication port group 123 or the bus 113, the packet SW mechanism 163 transfers the packet to a predetermined port. Upon transferring LTM to a destination, when transfer destination ports constitute a trunk, the packet SW mechanism 163 outputs the LTM to all the ports constituting the trunk. Further, the packet SW mechanism 163 manages the link-aggregation management table as shown in FIG. 4, and updates the LTM-transfer flag according to the condition.

The port monitoring unit 173 monitors the communication port group 123, and detects a fault or recovery of the communication ports P1 to P8 and the physical link connected to the communication ports P1 to P8. When the fault or recovery of the physical link is detected, the port monitoring unit 173 outputs a detection result to the setting controller 133.

When a fault occurs in the link aggregation port, the port monitoring unit 173 outputs information on the failed port to the setting controller 133. The port monitoring unit 173 updates the port management table upon receipt of an instruction from the setting controller 133. For example, the port monitoring unit 173 rewrites the flooding target flag of a normal port in the same trunk as the failed port to "1".

That is, the port monitoring unit 173 reduces the number of normal ports in a trunk by removing the port number of a failed port from port numbers of ports constituting the trunk, and resets to left-align the port numbers. When the failed port is recovered, the port monitoring unit 173 increases the number of normal ports in the trunk by adding the recovered port to port information constituting the trunk, and resets to left-align the port numbers.

Figure 27:
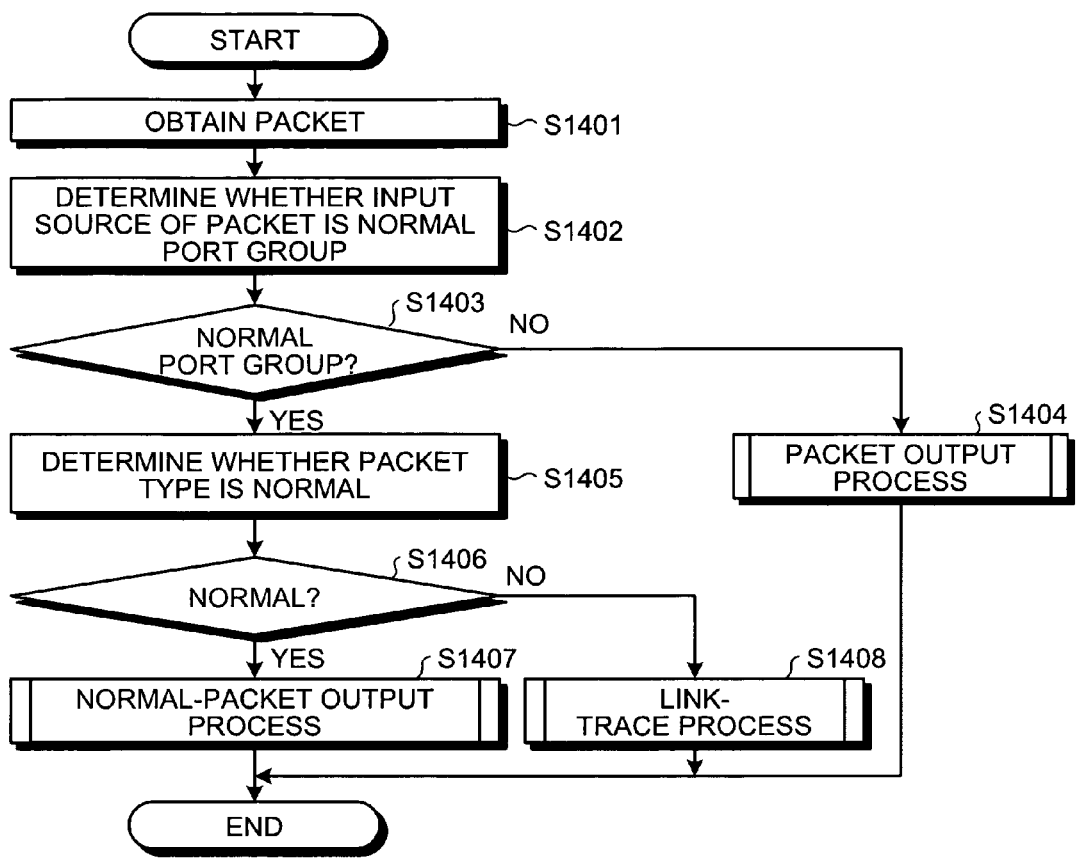
FIG. 27 is a flowchart of a process procedure performed by a packet SW mechanism shown in FIG. 26.

FIG. 27 is a flowchart of a process procedure performed by the packet SW mechanism 163. Although not mentioned, the packet SW mechanism installed in the packet transfer apparatuses 203 and 303 operates in the same manner as the packet SW mechanism 163. As shown in FIG. 27, the packet SW mechanism 163 obtains a packet (Step S1401), and determines whether the input source of the packet is a normal port group (Step S1402).

When the input source is not a normal port group (NO at Step S1403), the packet SW mechanism 163 performs the packet output process (Step S1404). On the other hand, when the input source of the packet is a normal port group (YES at Step S1403), the packet SW mechanism 163 determine whether the packet type is normal (Step S1405). When the packet is a normal packet (YES at Step S1406), the packet SW mechanism 163 performs the normal-packet output process (Step S1407). On the other hand, when the packet is not a normal packet (NO at Step S1406), the packet SW mechanism 163 performs the link-trace process (Step S1408).

Figure 28:
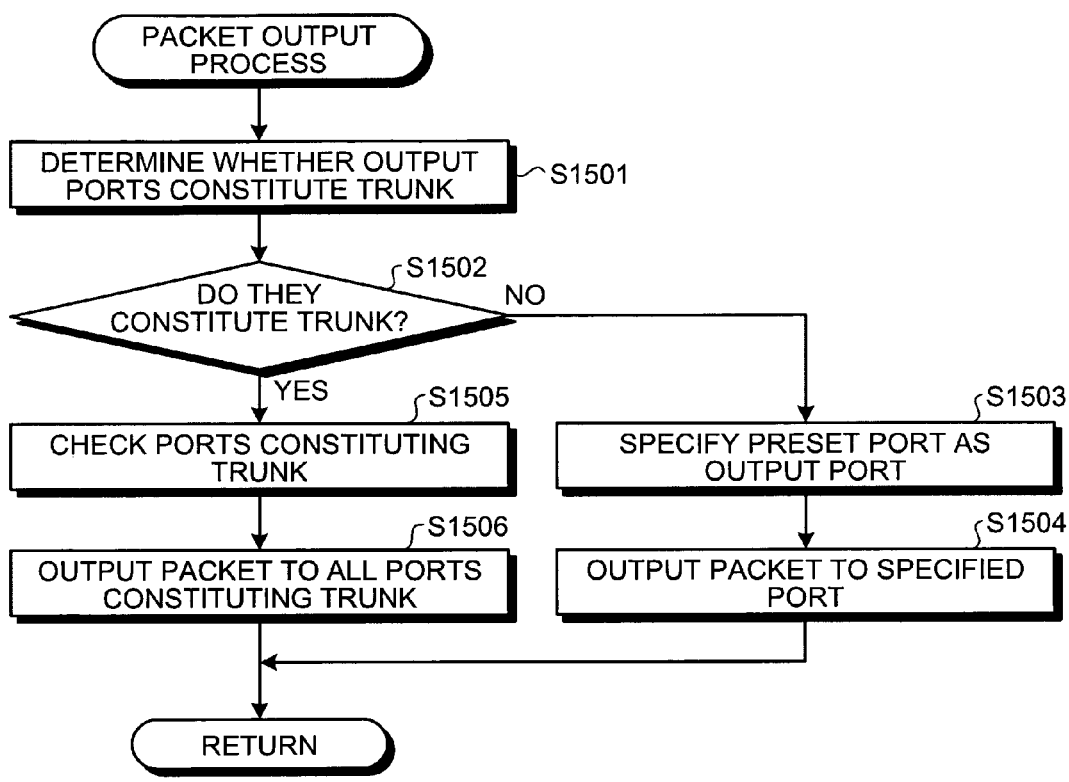
FIG. 28 is a detailed flowchart of a packet output process shown in FIG. 27.

FIG. 28 is a detailed flowchart of the packet output process performed at Step S1404 in FIG. 27. As shown in FIG. 28, the packet SW mechanism 163 determines whether the output ports constitute a trunk (Step S1501). When the output ports do not constitute a trunk (NO at Step S1502), the packet SW mechanism 163 specifies a preset port as the output port (Step S1503), and outputs the packet to the specified port (Step S1504).

Meanwhile, when the output ports constitute a trunk (YES at Step S1502), the packet SW mechanism 163 checks ports constituting a trunk (Step S1505), and outputs a packet to all the ports constituting the trunk (Step S1506).

Figure 29:
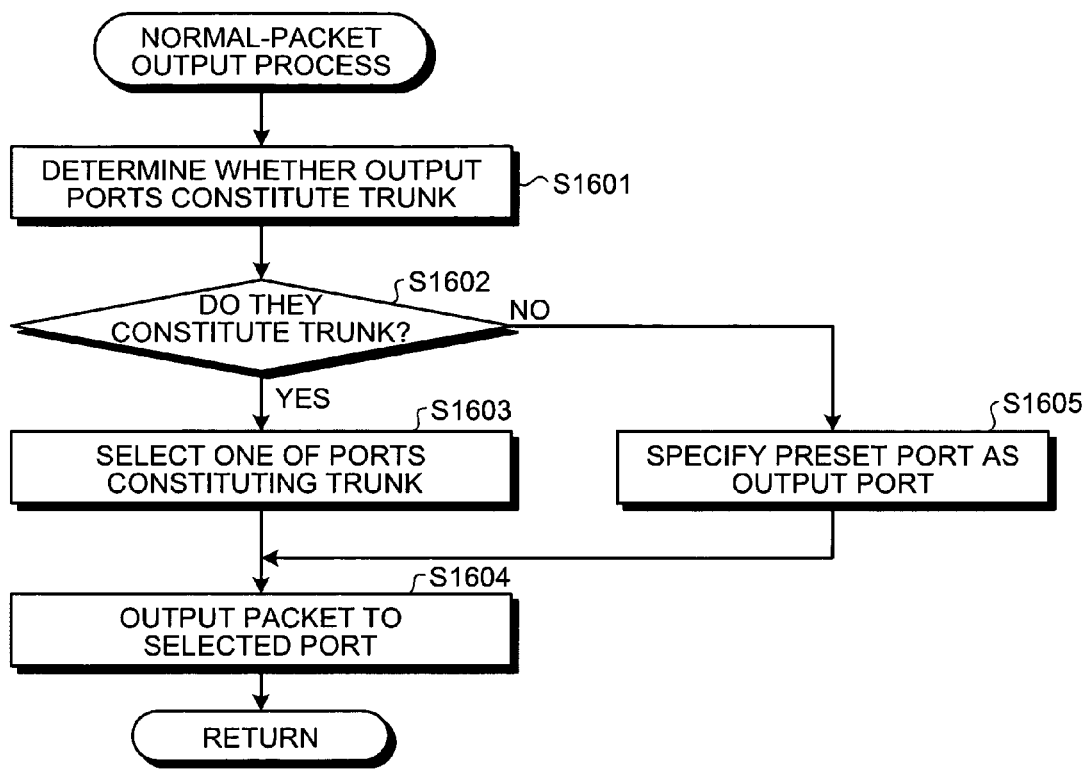
FIG. 29 is a detailed flowchart of a normal-packet output process shown in FIG. 27.

FIG. 29 is a detailed flowchart of the normal-packet output process performed at step S1407 in FIG. 27. As shown in FIG. 29, the packet SW mechanism 163 determines whether the output ports constitute a trunk (Step S1601).

When the output ports constitute a trunk (YES at Step S1602), the packet SW mechanism 163 selects one of the output ports constituting the trunk (Step S1603), and outputs a packet to the selected port (Step S1604). On the other hand, when the output ports do not constitute a trunk (NO at Step S1602), the packet SW mechanism 163 specifies a preset port as the output port (Step S1605), and the process control proceeds to step S1604.

Figure 30:
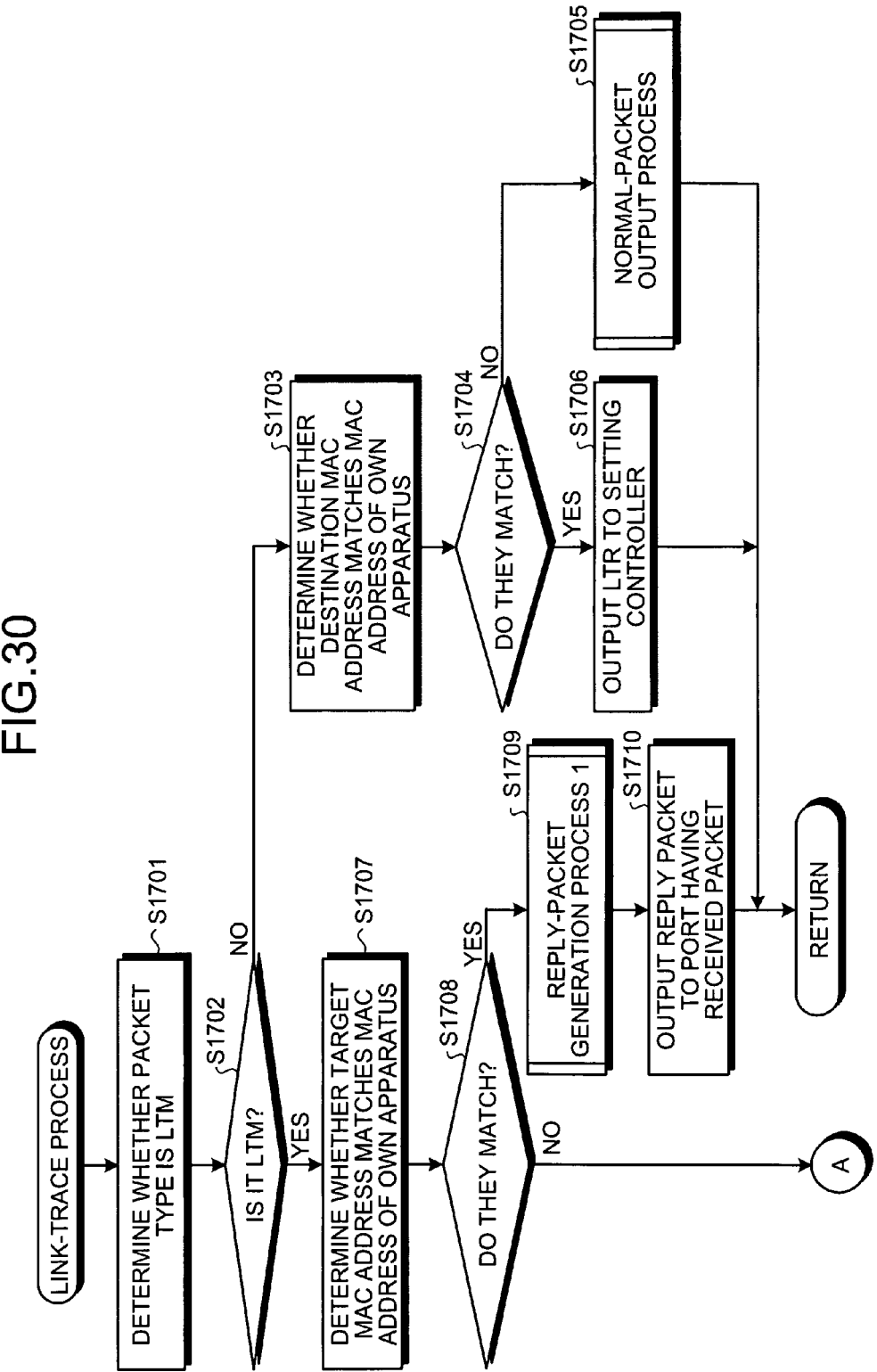
FIGS. 30 and 31 are detailed flowchart of a link-trace process shown in FIG. 27.
Figure 31:
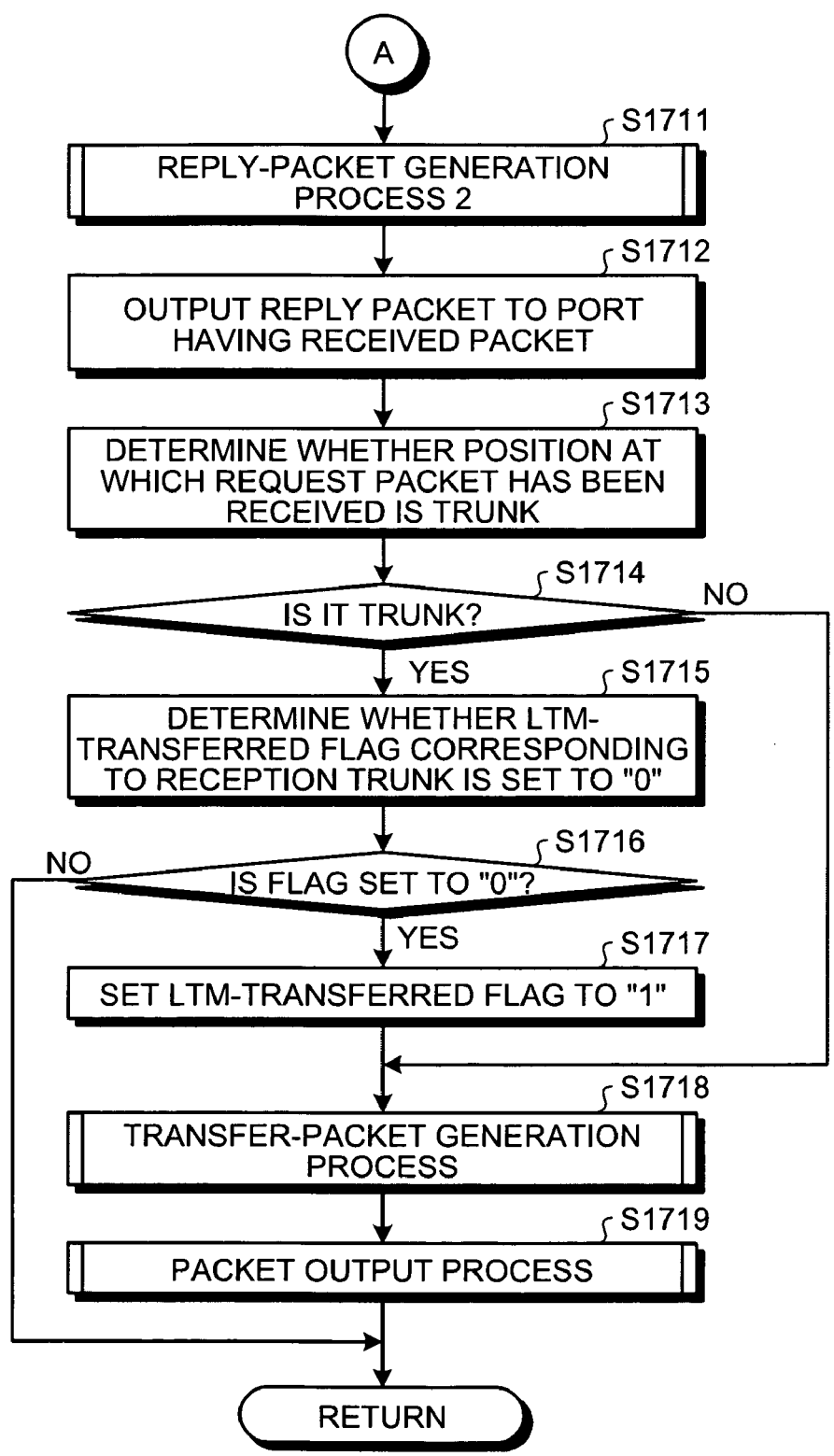

FIGS. 30 and 31 are detailed flowcharts of the link-trace process performed at Step S1408 in FIG. 27. As shown in FIG. 30, the packet SW mechanism 163 determines whether the packet type is LTM (Step S1701). When the packet type is LTR (NO at Step S1702), the packet SW mechanism 163 determines whether the destination MAC address matches the MAC address of the own apparatus (Step S1703).

When the addresses do not match (NO at Step S1704), the packet SW mechanism 163 performs the normal-packet output process (Step S1705). On the other hand, when the addresses match (YES at Step S1704), the packet SW mechanism 163 outputs LTR to the setting controller 133 (Step S1706).

When the packet type is LTM (YES at Step S1702), the packet SW mechanism 163 determines whether the target MAC address matches the MAC address of the own apparatus (Step S1707). When the target MAC address matches the MAC address of the own apparatus (YES at Step S1708), the packet SW mechanism 163 performs the reply-packet generation process 1 (Step S1709), and outputs a reply packet to the port having received the packet (Step S1710).

When the target MAC address does not match the MAC address of the own apparatus (NO at Step S1708), the packet SW mechanism 163 performs the reply-packet generation process 2 (Step S1711), outputs a reply packet to the port having received the packet (Step S1712), and determines whether the position at which the request packet has been received is a trunk (Step S1713).

When the position is not a trunk (NO at Step S1714), the process control proceeds to step S1718, described later. On the other hand, when the position is a trunk (YES at Step S1714), the packet SW mechanism 163 determines whether the LTM-transfer flag corresponding to the reception trunk is set to "0" (Step S1715).

When the LTM-transfer flag is set to "1" (NO at Step S1716), the packet SW mechanism 163 finishes the link-trace process. On the other hand, when the LTM-transfer flag is set to "0" (YES at Step S1716), the packet SW mechanism 163 sets the flag to "1" (Step S1717), performs the transfer-packet generation process (Step S1718), and performs the packet output process (Step S1719).

The normal-packet output process at Step S1705 in FIG. 30 is performed in the same manner as previously described in connection with FIG. 29. The reply-packet generation process 1 at Step S1709 in FIG. 30 is performed in the same manner as previously described in FIG. 46.

The reply-packet generation process 2 at Step S1711 in FIG. 31 is performed in the same manner as previously described in connection with FIG. 47. The transfer-packet generation process at Step S1718 in FIG. 31 is performed in the same manner as previously described in connection with FIG. 48. The packet output process at Step S1719 in FIG. 31 performed in the same manner as previously described in connection with FIG. 28. Therefore, the same explanation is not repeated.

As described above, according to the fourth embodiment, upon receipt of LTM, a packet transfer apparatus (103 to 303) transfers the LTM, when links to the transfer destination constitute a link aggregation, to all physical links constituting the link aggregation. The packet transfer apparatus (103 to 303) then receives LTR from the respective physical links in response to the LTM, and generates link-trace result data. Based on the link-trace result data, the administrator can accurately recognize the number of physical links capable of normal packet transfer.

Of respective processes explained in the above embodiments, all or part of the process explained as being performed automatically can be performed manually, or all or part of the process explained as being performed manually can be performed automatically by a known method.

The process procedures, control procedures, specific names, and information including various types of data and parameters mentioned in the above description and the drawings can be arbitrarily changed unless otherwise specified.

The constituent elements of the switch and the packet transfer apparatus described in the above embodiments are functionally conceptual, and need not necessarily be physically configured as illustrated. That is, the configuration of the respective apparatuses is not limited to that shown in the drawings, and can be functionally or physically separated or integrated, partly or wholly, according to the various kinds of load and the use condition.

The function of each apparatus can be entirely or partially realized by a central processing unit (CPU) or a computer program executed by CPU. The function can also be implemented in wired-logic hardware.

As set forth hereinabove, according to an embodiment, the state of physical links constituting a link aggregation can be determined based on a response therefrom. Moreover, network traffic can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A packet transfer apparatus that transfers a packet by using a trunk that is a virtual logical link consisting of multiple physical links with at least one other apparatus, the packet transfer apparatus comprising:
a storage unit that stores information about whether a search packet for a path search received from each trunk is previously output or not;
a determining unit that determines whether the search packet received from a first trunk is previously output or not based on the information stored in the storage unit; and
an output controller that outputs the search packet received from the first trunk to a second trunk based on a determination result of the determining unit, wherein
the output controller stops outputting the search packet received from the first trunk to the second trunk, when the determining unit determines that the search packet received from the first trunk is previously output.

2. The packet transfer apparatus according to claim 1, further comprising a reply unit that generates, upon receipt of a plurality of search packets from the first trunk, a reply packet in response to each of the search packets, and outputs the reply packet to a sender of a corresponding one of the search packets.

3. The packet transfer apparatus according to claim 2, upon receipt of a plurality of search packets from the first trunk, the reply unit transfers one of the search packets from the second trunk to a destination of the search packet.

4. The packet transfer apparatus according to claim 2, the reply unit generating a reply packet including information for identifying the trunk and the physical links.

5. The packet transfer apparatus according to claim 2, further comprising a transfer unit that is connected to the trunk via a port identified by a media access control address, and
the search packet and the reply packet are assigned the media access control address of the port as a sender address or a destination address.

6. The packet transfer apparatus according to claim 2, further comprising:
an analyzing unit that analyzes a state of each of the physical links by comparing a link information and a reply packet received from the physical link, and wherein the storage unit stores therein link information on the physical links constituting each trunk.

7. A packet transfer method of transferring a packet by using a trunk that is a virtual logical link consisting of multiple physical links with at least one other apparatus, the packet transfer method comprising:
determining, using a processor, whether a search packet for a path search received from a first trunk is previously output or not, based on information about whether a search packet received from each trunk is previously output or not, the information being stored in a storing unit; and
outputting, using the processor, the search packet received from the first trunk to a second trunk based on a determination result of the determining, wherein
the outputting includes stopping outputting the search packet received from the first trunk to the second trunk, when the determining determines that the search packet received from the first trunk is previously output.

8. The packet transfer method according to claim 7, further comprising:
generating, upon receipt of a plurality of search packets from the first trunk, a reply packet in response to each of the search packets; and
returning the reply packet to a sender of a corresponding one of the search packets.

9. The packet transfer method according to claim 8, the returning including, upon receipt of a plurality of search packets from the first trunk, transferring one of the search packets from the second trunk to a destination of the search packet.

10. The packet transfer method according to claim 8, further comprising generating a reply packet including information for identifying the trunk and the physical links.

11. The packet transfer method according to claim 8, further comprising
generating a reply packet in response to each of the search packets which is assigned a media access control address of a port as a sender address or a destination address from a trunk connected to a port identified by a media access control address of the port as a sender address or a destination address, and
returning the reply packet which is assigned the media access control address of the port as a sender address or a destination address.

12. The packet transfer method according to claim 8, wherein
the information includes link information on the physical links constituting each trunk, and further comprising
analyzing state of each of the physical links by comparing the link information and a reply packet received from the physical link.

* * * * *